United States Patent
Chen et al.

(10) Patent No.: US 12,556,737 B2
(45) Date of Patent: *Feb. 17, 2026

(54) MOTION COMPENSATION FOR VIDEO ENCODING AND DECODING

(71) Applicant: InterDigital VC Holdings, Inc., Wilmington, DE (US)

(72) Inventors: Ya Chen, Rennes (FR); Franck Galpin, Thorigne-Fouillard (FR); Tangi Poirier, Thorigné-fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,846

(22) Filed: Dec. 13, 2023

(65) Prior Publication Data

US 2024/0121423 A1  Apr. 11, 2024

Related U.S. Application Data

(63) Continuation of application No. 17/051,825, filed as application No. PCT/US2019/031068 on May 7, 2019, now Pat. No. 11,902,560.

(30) Foreign Application Priority Data

May 9, 2018 (EP) .................................... 18305568

(51) Int. Cl.
  *H04N 19/513* (2014.01)
  *H04N 19/132* (2014.01)
  (Continued)

(52) U.S. Cl.
  CPC ......... *H04N 19/513* (2014.11); *H04N 19/132* (2014.11); *H04N 19/149* (2014.11); *H04N 19/176* (2014.11); *H04N 19/46* (2014.11)

(58) Field of Classification Search
  None
  See application file for complete search history.

(56) References Cited

U.S. PATENT DOCUMENTS

| | | |
|---|---|---|
| 2016/0295240 A1 | 10/2016 | Kim et al. |
| 2017/0150183 A1 | 5/2017 | Zhang et al. |

(Continued)

FOREIGN PATENT DOCUMENTS

| | | |
|---|---|---|
| CN | 105659604 A | 6/2016 |
| CN | 107147911 A | 9/2017 |

(Continued)

OTHER PUBLICATIONS

Chen, et al., "Algorithm Description of Joint Exploration Test Model", Qualcomm Incorporated, Joint Video Exploration Team (JVET) of ITU-T SG 16 WP 3, and ISO/IEC JTC 1/SC 29/WG 11, 2nd Meeting: San Diego, USA, Feb. 20-26, 2016, 33 pages.

(Continued)

*Primary Examiner* — Michael J Hess
(74) *Attorney, Agent, or Firm* — Condo Roccia Koptiw LLP

(57) ABSTRACT

A video codec can involve processing video information based on a motion model involving a coding unit including a plurality of sub-blocks, such as an affine motion model, to produce motion compensation information, obtaining a local illumination compensation model, and encoding or decoding the video information based on the motion compensation information and the local illumination compensation model.

20 Claims, 28 Drawing Sheets

(51) Int. Cl.
*H04N 19/149* (2014.01)
*H04N 19/176* (2014.01)
*H04N 19/46* (2014.01)

(56) References Cited

U.S. PATENT DOCUMENTS

| | | | |
|---|---|---|---|
| 2018/0098086 A1* | 4/2018 | Chuang | H04N 19/198 |
| 2018/0098087 A1 | 4/2018 | Li et al. | |
| 2018/0270500 A1* | 9/2018 | Li | H04N 19/52 |
| 2019/0058896 A1 | 2/2019 | Huang et al. | |
| 2020/0288139 A1* | 9/2020 | Lee | H04N 19/159 |
| 2021/0076029 A1* | 3/2021 | Han | H04N 19/176 |

FOREIGN PATENT DOCUMENTS

| | | |
|---|---|---|
| CN | 108293112 A | 7/2018 |
| EP | 3 316 580 A2 | 5/2018 |
| TW | 201803351 A | 1/2018 |
| WO | 2016/200777 A1 | 12/2016 |
| WO | 2018/070152 A1 | 4/2018 |

OTHER PUBLICATIONS

Chen, et al., "Algorithm Description of Joint Exploration Test Model 2", JVET-B1001_V3, Editors, Joint Video Exploration Team (JVET) of ITU-T SG16 WP3 and ISO/IEC JTC1/SC29/WG11, 2nd Meeting, San Diego, California, USA, Feb. 20-26, 2016, 32 pages.

Chen, et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 7 pages.

Chen, et al., "CE1-Related: Combination of LIC and Affine", JVET-N0171-v1, Huawei Technologies Co., Ltd, Joint Video Experts Team (JVET) of ITU-T SG 16 WP 3 and ISO/IEC JTC 29/WG 11, 14th Meeting: Geneva, CH, Mar. 19-27, 2019, 8 pages.

ITU-T, "High Efficiency Video Coding", H.265, Telecommunications Standardization Sector of ITU, Series H: Audiovisual and Multimedia Systems, Infrastructure of Audiovisual Services—Coding of Moving Video, Oct. 2014, 540 pages.

ITU-T, "High Efficiency Video Coding", H.265, Telecommunications Standardization Sector of ITU, Series H: Audiovisual and Multimedia Systems, Infrastructure of Audiovisual Services—Coding of Moving Video, Apr. 2015, 634 pages.

Liu, et al., "Local Illumination Compensation", VCEG-AZ06, Qualcomm Incorporated, ITU—Telecommunications Standardization Sector, Study Group 16 Question 6, Video Coding Experts Group (VCEG), 52nd Meeting, Warsaw, Poland, Jun. 19-26, 2015, 4 pages.

Marzuki, et al., "Overview of Potential Technologies for Future Video Coding Standard (FVC) in JEM Software: Status and Review", IEIE Transactions on Smart Processing and Computing, vol. 7, No. 1, Feb. 28, 2018, pp. 22-35.

Toma, et al., "Description of SDR Video Coding Technology Proposal by Panasonic", JVET-J0020-v1, Panasonic, Joint Video Experts Team (JVET) of ITU-T SG16 WP3 and ISO/IEC JTC 1/SC 29/WG 11, 10th Meeting: San Diego, California, USA, Apr. 10, 2018, 6 pages.

* cited by examiner

MOTION COMPENSATION FOR VIDEO ENCODING AND DECODING

CROSS-REFERENCE TO RELATED APPLICATIONS

This application is a continuation application of U.S. patent application Ser. No. 17/051,825, filed on Oct. 30, 2020, which is a National Stage Entry under 35 U.S.C. § 371 of Patent Cooperation Treaty Application No. PCT/US2019/031068, filed May 7, 2019, which claims the benefit of European Patent Application No. 18305568.0, filed May 9, 2018, the contents of all of which are hereby incorporated herein by reference as if fully set forth.

TECHNICAL FIELD

The present disclosure involves video encoding and decoding.

BACKGROUND

To achieve high compression efficiency, image and video coding schemes such as that defined by the HEVC (High Efficiency Video Coding) standard usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data is decoded by inverse processes corresponding to the prediction, transform, quantization, and entropy coding. Recent additions to video compression technology include various versions of the reference software and/or documentation of the Joint Exploration Model (JEM) being developed by the Joint Video Exploration Team (JVET). An aim of efforts such as JEM is to make further improvements to existing standards such as HEVC.

SUMMARY

In general, an example of an embodiment of a method, or apparatus including, e. g., one or more processors, can comprise processing video information based on an affine motion model to produce motion compensation information; obtaining a local illumination compensation model; and encoding the video information based on the motion compensation information and the local illumination compensation model; wherein obtaining the local illumination compensation model comprises determining at least one model parameter of a linear model of illumination changes in the video information based on a plurality of motion vectors included in the motion compensation information; and the video information comprises a coding unit having a plurality of sub-blocks including a first row of sub-blocks and a first column of sub-blocks; and the plurality of motion vectors comprises a group of motion vectors associated with respective ones of each sub-block included in the first row of sub-blocks and each sub-block included in the first column of sub-blocks; and determining the at least one model parameter comprises obtaining a set of reconstructed samples forming a quasi L-shape based on the group of motion vectors; and evaluating a local distortion based on the set of reconstructed samples.

Another example of an embodiment of a method, or apparatus including, e.g., one or more processors, can comprise processing video information based on an affine motion model to produce motion compensation information; obtaining a local illumination compensation model; and encoding the video information based on the motion compensation information and the local illumination compensation model; wherein the video information comprises a coding unit having a plurality of sub-blocks including a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and obtaining the local illumination compensation model comprises determining at least one model parameter of a linear model of illumination changes in the video information based on one or more of a first subset of the first set of motion vectors or a second subset of the second set of motion vectors; and determining the at least one model parameter comprises obtaining a set of reconstructed samples forming a quasi L-shape based on the one or more of the first subset of the first set of motion vectors or the second subset of the second set of motion vectors; and evaluating a local distortion based on the set of reconstructed samples.

Another example of an embodiment of a method, or apparatus including, e.g., one or more processors, can comprise processing video information based on an affine motion model to produce motion compensation information; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the video information comprises a coding unit having a plurality of sub-blocks; and the first motion vector is associated with a first one of the plurality of sub-blocks located in the upper left corner of the coding unit; and determining the at least one model parameter comprises obtaining a set of reconstructed samples forming an L-shape based on the first motion vector; and evaluating a local distortion based on the set of reconstructed samples.

Another example of an embodiment of a method, or apparatus including, e. g., one or more processors, can comprise processing video information based on an affine motion model to produce motion compensation information; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a center of the coding unit; and determining the at least one model parameter comprises obtaining a set of reconstructed samples forming an L-shape based on the first motion vector; and evaluating a local distortion based on the set of reconstructed samples.

Another example of an embodiment of a method, or apparatus including, e. g., one or more processors, can comprise processing video information based on a coding unit comprising a plurality of sub-blocks to produce motion compensation information comprising a plurality of motion vectors associated with respective ones of the plurality of sub-blocks; obtaining a local illumination compensation model; and encoding the video information based on the motion compensation information and the local illumination compensation model; wherein obtaining the local illumination compensation model comprises determining at least one model parameter of a linear model of illumination changes in the video information based on at least one of the plurality of motion vectors; and the plurality of sub-blocks included in the coding unit comprises a first row of sub-blocks and a first column of sub-blocks; and the plurality of motion vectors comprises a group of motion vectors associated with respective ones of each sub-block included in the first row of sub-blocks and each sub-block included in the first column of sub-blocks; and determining the at least one model parameter comprises obtaining a set of reconstructed samples forming a quasi L-shape based on the group of motion vectors; and evaluating a local distortion based on the set of reconstructed samples.

Another example of an embodiment of a method, or apparatus including, e. g., one or more processors, can comprise processing video information based on a coding unit comprising a plurality of sub-blocks to produce motion compensation information; obtaining a local illumination compensation model; and encoding the video information based on the motion compensation information and the local illumination compensation model; wherein the plurality of sub-blocks included in the coding unit comprises a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and obtaining the local illumination compensation model comprises determining at least one model parameter of a linear model of illumination changes in the video information based on one or more of a first subset of the first set of motion vectors or a second subset of the second set of motion vectors; and determining the at least one model parameter comprises obtaining a set of reconstructed samples forming a quasi L-shape based on the one or more of the first subset of the first set of motion vectors or the second subset of the second set of motion vectors; and evaluating a local distortion based on the set of reconstructed samples.

Another example of an embodiment of a method, or apparatus including, e. g., one or more processors, can comprise processing video information based on a coding unit comprising a plurality of sub-blocks to produce motion compensation information comprising a plurality of motion vectors associated with respective ones of the plurality of sub-blocks; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a first one of the plurality of sub-blocks located in an upper left corner of the coding unit; and determining the at least one model parameter comprises obtaining a set of reconstructed samples forming an L-shape based on the first motion vector; and evaluating a local distortion based on the set of reconstructed samples.

Another example of an embodiment of a method, or apparatus including, e. g., one or more processors, can comprise processing video information based on a coding unit comprising a plurality of sub-blocks to produce motion compensation information comprising a plurality of motion vectors associated with respective ones of the plurality of sub-blocks; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a center of the coding unit; and determining the at least one model parameter comprises obtaining a set of reconstructed samples forming an L-shape based on the first motion vector; and evaluating a local distortion based on the set of reconstructed samples.

In general, an embodiment can involve a method for encoding video information comprising processing the video information based on an affine motion model to produce motion compensation information, obtaining a local illuminati on compensation model, and encoding the video information based on the motion compensation information and the local illumination compensation model.

In general, another embodiment can involve apparatus for encoding video information comprising one or more processors, wherein the one or more processors are configured for processing the video information based on an affine motion model to produce motion compensation information, obtaining a local illumination compensation model, and encoding the video information based on the motion compensation information and the local illuminati on compensation model.

In general, another embodiment can involve a method of decoding video information comprising processing the video information based on an affine motion model to produce motion compensation information, obtaining a local illumination compensation model, and decoding the video information based on the motion compensation information and the local illumination compensation model.

In general, another embodiment can involve apparatus for decoding video information comprising one or more processors, wherein the one or more processors are configured for processing the video information based on an affine motion model to produce motion compensation information, obtaining a local illumination compensation model, and encoding the video information based on the motion compensation information and the local illuminati on compensation model.

In general, another embodiment can involve a bitstream formatted to include encoded video information, wherein the encoded video data are encoded by processing the video information based on an affine motion model to produce motion compensation information, obtaining a local illumination compensation model, and encoding the video information based on the motion compensation information and the local illumination compensation model.

In general, one or more embodiments can also provide a computer readable storage medium, e.g., a non-volatile computer readable storage medium, having stored thereon instructions for encoding or decoding video data according to the methods or the apparatuses described herein. One or more of the present embodiments can also provide a computer readable storage medium having stored thereon a bitstream generated according to methods or apparatus described herein. One or more of the present embodiments can also provide methods and apparatus for transmitting or receiving the bitstream generated according to methods or apparatus described herein.

BRIEF DESCRIPTION OF THE DRAWINGS

The present disclosure may be better understood by consideration of the detailed description below along with the accompanying figures, in which.

In the various figures, like reference designators refer to the same or similar features.

DETAILED DESCRIPTION

Recent efforts to advance video compression technology such as that associated with the Joint Exploration Model (JEM) being developed by the Joint Video Exploration Team (JVET), provide advance features and tools. For example, such development efforts include providing support for additional motion models to improve temporal prediction. One such motion model is an affine motion model as described in more detail below. Support for a tool such as block-based local illumination compensation (LIC) is also provided. The LIC tool involves applying a LIC model to predict a variation of illumination which may occur between a predicted block and a corresponding reference block used for motion compensated prediction. Various aspects and embodiments described herein involve motion models and tools such as, for example, an affine motion model and LIC tool.

This document describes a variety of aspects, including tools, features, embodiments, models, approaches, etc. Many of these aspects are described with specificity and, at least to show the individual characteristics, are often described in a manner that can sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
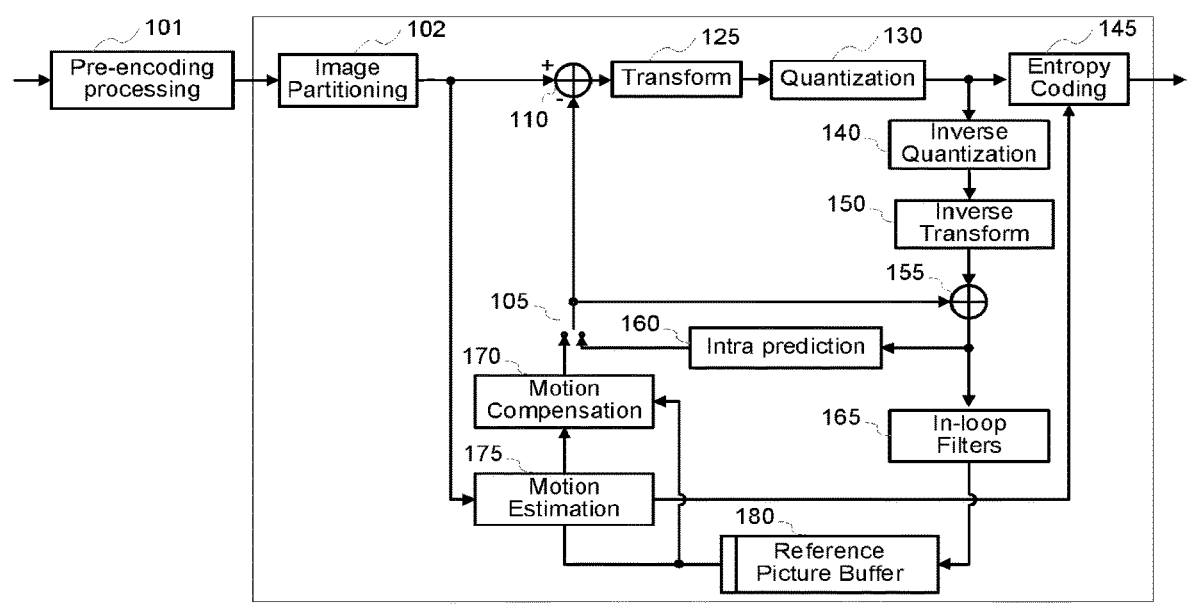
FIG. 1 illustrates a block diagram of an example of an embodiment of a video encoder.
Figure 2:
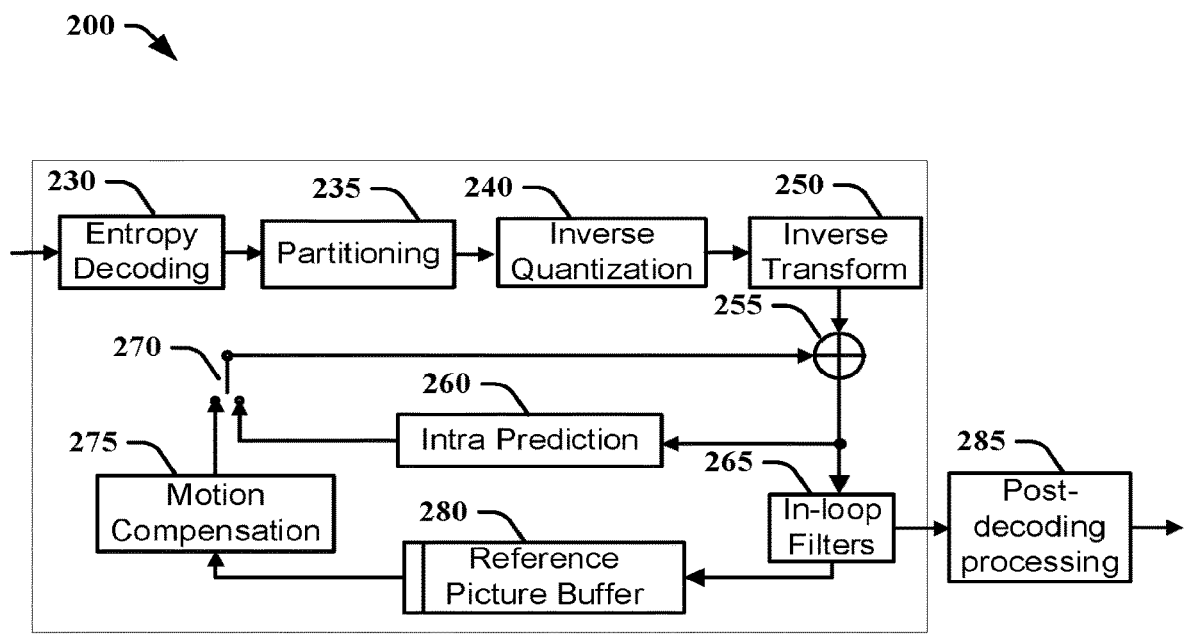
FIG. 2 illustrates a block diagram of an example of an embodiment of a video decoder.
Figure 3:
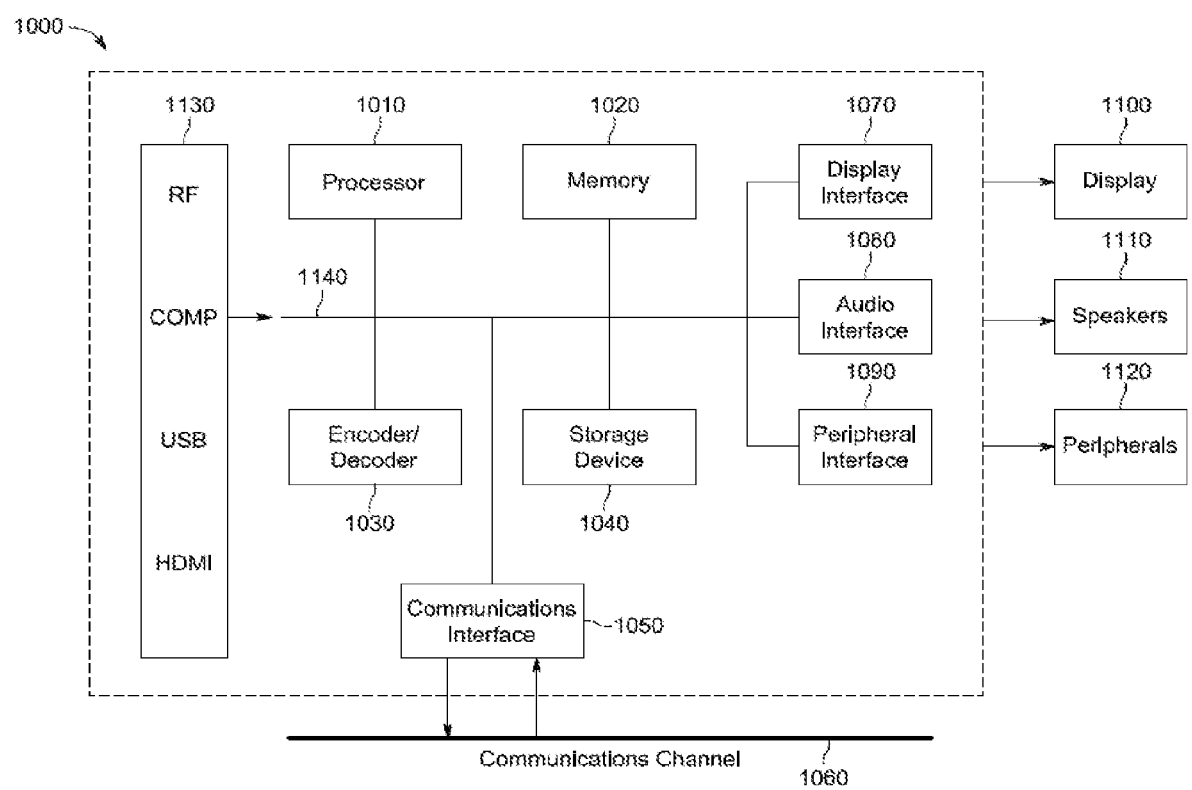
FIG. 3 illustrates a block diagram of an example of an embodiment of a system providing video encoding and/or decoding.

The aspects described and contemplated in this document can be implemented in many different forms. FIGS. 1, 2 and 3 below, as well as other figures throughout this document provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, or a computer readable storage medium. For example, a computer-readable storage medium can be a non-transitory computer-readable medium. A computer-readable storage medium can have stored thereon instructions for encoding or decoding video data according to any of the methods described, and/or a bitstream generated according to any of the methods described.

In the present application, the terms "reconstructed" and "decoded" can be used interchangeably, the terms "pixel" and "sample" can be used interchangeably, the terms "image," "picture" and "frame" can be used interchangeably. Usually, but not necessarily, the term "reconstructed" is used at the encoder side while "decoded" is used at the decoder side.

Various methods are described above, and each of the methods comprises one or more steps or actions for achieving the described method. Unless a specific order of steps or actions is required for proper operation of the method, the order and/or use of specific steps and/or actions can be modified or combined.

Various methods and other aspects described in this document can be used to modify one or more modules of a video encoder and/or decoder such as, for example, motion estimation module 170, motion compensation module 175 and/or motion compensation module 275 of a JVET or HEVC encoder 100 and decoder 200 as shown in FIGS. 1 and FIG. 2, respectively. Moreover, the present aspects are not limited to WET or HEVC, and can be applied, for example, to other standards and recommendations, whether pre-existing or future-developed, and extensions of any such standards and recommendations (including WET and HEVC). Unless indicated otherwise, or technically precluded, the aspects described in this document can be used individually or in combination.

Various numeric values can be used in the present document. Any specific numeric values are examples and the aspects described are not limited to these specific values.

FIGS. 1, 2 and 3 illustrate, respectively, block diagrams of examples of embodiments of an encoder 100, a decoder 200, and a system 1000. Variations of encoder 100, decoder 200 and system 1000 are contemplated, but the examples described below are provided and described for purposes of clarity without describing all possible or expected variations.

In FIG. 1, before being encoded, the video sequence can go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of an example of a video decoder 200. In the decoder 200, a bitstream is decoded by the decoder elements as described below. Video decoder 200 generally performs a decoding pass reciprocal to the encoding pass as described in FIG. 1. As mentioned above, encoder 100 in FIG. 1 also generally performs video decoding as part of encoding video data, e.g., to provide a reference for further predictions.

In particular, the input of the decoder includes a video bitstream, which can be generated by a video encoder such as video encoder 100 of FIG. 1. The bitstream is first entropy decoded (230) to obtain transform coefficients, motion vectors, and other coded information. The picture partition information indicates how the picture is partitioned. The decoder can therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of a system in which various aspects and embodiments can be implemented. System 1000 can be embodied as a device including the various components described below and is configured to perform one or more of the aspects described in this document. Examples of such devices, include, but are not limited to, personal computers, laptop computers, smartphones, tablet computers, digital multimedia set top boxes, digital television receivers, personal video recording systems, connected home appliances, and servers. System 1000 can be communicatively coupled to other similar systems, and to a display via a communication channel as shown in FIG. 3 and as known by those skilled in the art to implement one or more of the various aspects described in this document.

The system 1000 can include at least one processor 1010 configured to execute instructions loaded therein for implementing one or more of the various aspects described in this document. Processor 1010 can include embedded memory, input output interface, and various other circuitries as known in the art. The system 1000 can include at least one memory 1020 (e.g., a volatile memory device, anon-volatile memory device). System 1000 can include a storage device 1040, which can include non-volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples. System 1000 can include an encoder/decoder module 1030 configured to process data to provide an encoded video or decoded video.

Encoder/decoder module 1030 represents the module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processors 1010 as a combination of hardware and software as known to those skilled in the art.

Program code to be loaded onto processors 1010 to perform the various aspects described in this document can be stored in storage device 1040 and subsequently loaded onto memory 1020 for execution by processors 1010. In accordance with the embodiments, one or more of the processor(s) 1010, memory 1020, storage device 1040, and encoder/decoder module 1030 can store one or more of the various items during the performance of the processes described in this document, including, but not limited to the input video, the decoded video, the bitstream, equations, formulas, matrices, variables, operations, and operational logic.

The system 1000 can include communication interface 1050 that enables communication with other devices via communication channel 1060. The communication interface 1050 can include, but is not limited to, a transceiver configured to transmit and receive data from communication channel 1060. The communication interface can include, but is not limited to, a modem or network card and the communication channel can be implemented within a wired and/or a wireless medium. The various components of system 1000 can be connected or communicatively coupled together using various suitable connections, including, but not limited to internal buses, wires, and printed circuit boards.

As will be explained in detail below, aspects and embodiments in accordance with the present disclosure can relate to features of the systems shown in FIGS. 1, 2 and 3 such as a motion estimation feature, e.g., module 175 of FIG. 1, and a motion compensation feature, such as module 170 of FIG. 1, and/or module 275 of FIG. 2.

For clarity of description, the following detailed description will describe aspects with reference to embodiments involving video compression technology such as, for example, HEVC, JEM and/or H.266. However, the described aspects are applicable to other video processing technologies and standards.

Figure 4:
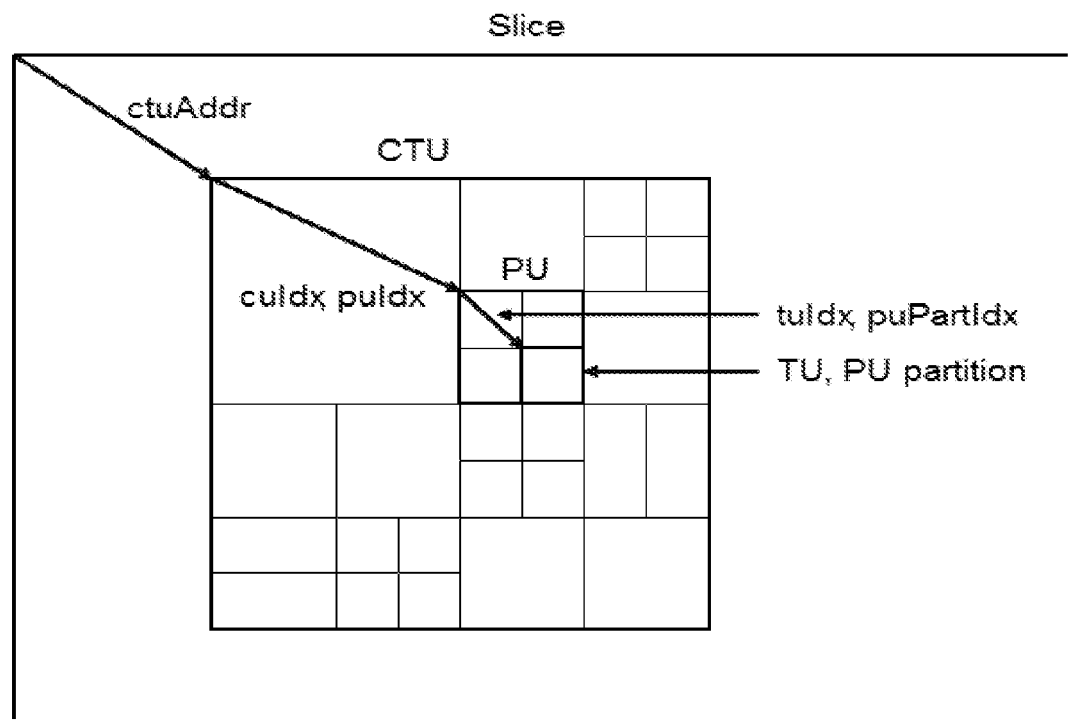
FIG. 4 illustrates an example of division of a Coding Tree Unit (CTU) into Coding Units (CU), Prediction Units (PU) and Transform Units (TU) such as, for example, in HEVC.

In the HEVC video compression standard, a picture is divided into so-called Coding Tree Units (CTU), and each CTU is represented by a Coding Unit (CU) in the compressed domain. Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level. An illustration of a division of a Coding Tree Unit into Coding Units, Prediction Units and Transform Units is shown in FIG. 4.

In Inter coding mode, motion compensated temporal prediction is employed to exploit the redundancy that exists between successive pictures of a video. To do it, exactly one motion vector (MV) is assigned to each PU in HEVC. Therefore, in HEVC, the motion model that links a PU and its reference block simply comprises a translation.

Figure 5:
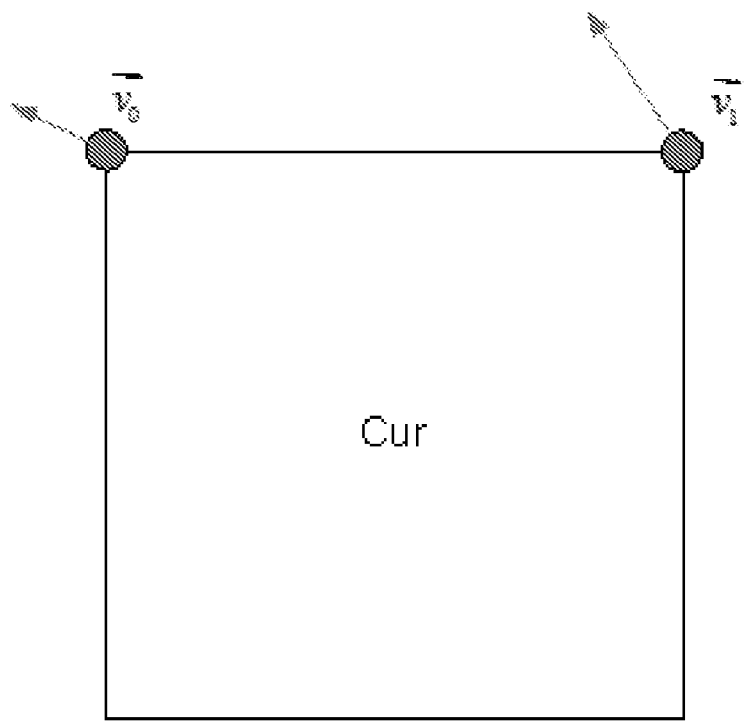
FIG. 5 illustrates an example of an affine motion model such as that used in the Joint Exploration Model (JEM)

In at least one version of the Joint Exploration Model (JEM) developed by the JVET (Joint Video Exploration Team) group, a CU is no longer divided into PU or TU, and some motion information (prediction information in inter mode) is directly assigned to each CU. In the JEM, a CU can be divided into sub-CU and a motion vector can be computed for each sub-CU. Additionally, some richer motion models are supported to improve temporal prediction. One of the new motion models introduced in the JEM is the affine model, which basically comprises using an affine model to represent the motion vectors in a CU. The motion model used is illustrated by FIG. 5. The affine model can be used to generate the motion field inside a CU for motion prediction. For example, the affine motion field comprises motion vector component values for each position (x,y) inside the considered block as defined by Equation 1:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Equation 1}$$

affine model used to generate the motion field inside a $CU$ to predict where $(v_{0x}, v_{0y})$ and $(v_{1x}, v_{1y})$ are the so-called control point motion vectors used to generate the affine motion field. $(v_{0x}, v_{0y})$ is the motion vector top-left corner control point; $(v_{1x}, v_{1y})$ is the motion vector top-right corner control point.

Figure 6:
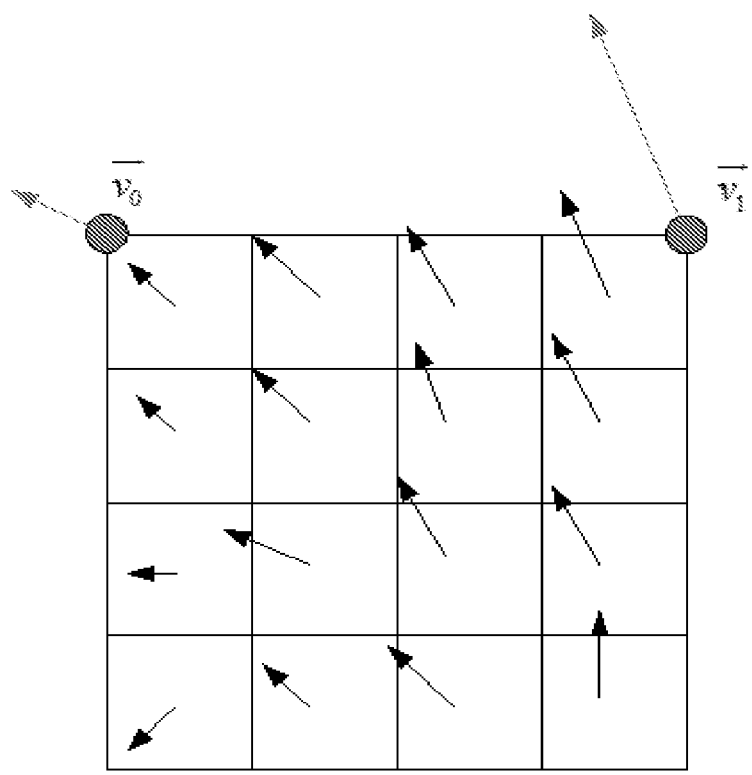
FIG. 6 illustrates an example of a 4×4 sub-CU based affine motion vector field.

In practice, to keep complexity reasonable, a motion vector can be computed, for example, for each 4×4 sub-block (sub-CU) of the considered CU, as illustrated in FIG. 6. An affine motion vector is computed from the control point motion vectors, at the position of the center of each sub-block. As a result, the temporal prediction of a CU in the affine mode involves motion compensated predicting each sub-block with its own motion vector.

Affine motion compensation can be used in at least two ways, e.g., in the JEM: Affine AMVP (Advanced Motion Vector Prediction) or AF_AMVP and Affine Merge:

Affine AMVP (AF_AMVP).

Figure 7:
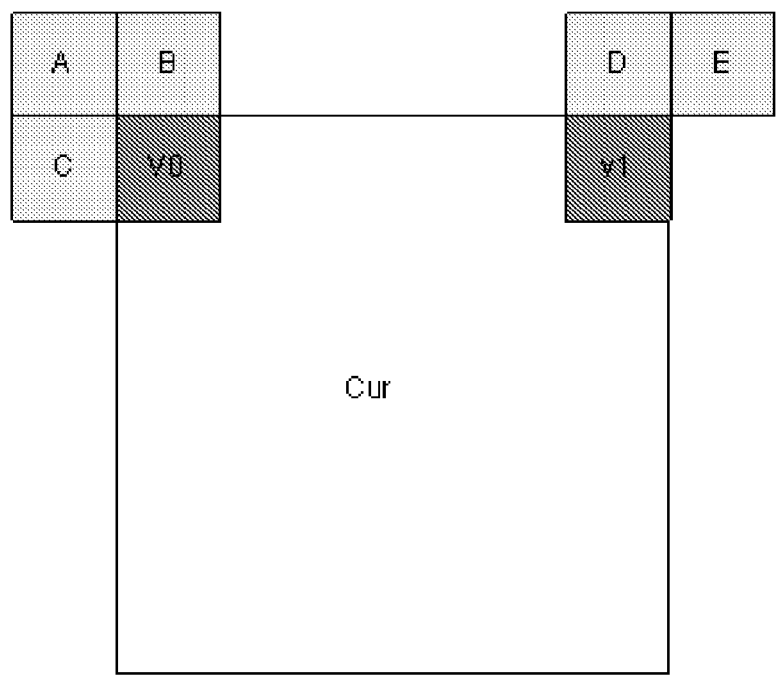
FIG. 7 illustrates an example of a motion vector (MV) prediction process for affine AMVP CU.

A CU in AMVP mode, which size is larger than 8×8, can be predicted in Affine AMVP mode. This is signaled through a flag in the bit-stream. The generation of the Affine Motion Field for that inter CU includes determining control point motion vectors (CPMV), which are obtained by the decoder through the addition of a motion vector difference and a control point motion vector prediction (CPMVP). The CPMVP is a pair of motion vector candidates, respectively taken from the list (A, B, C) and (D, E) as illustrated in FIG. 7 which shows an example of a motion vector prediction process for Affine AMVP CUs.

Affine Merge.

Figure 8:
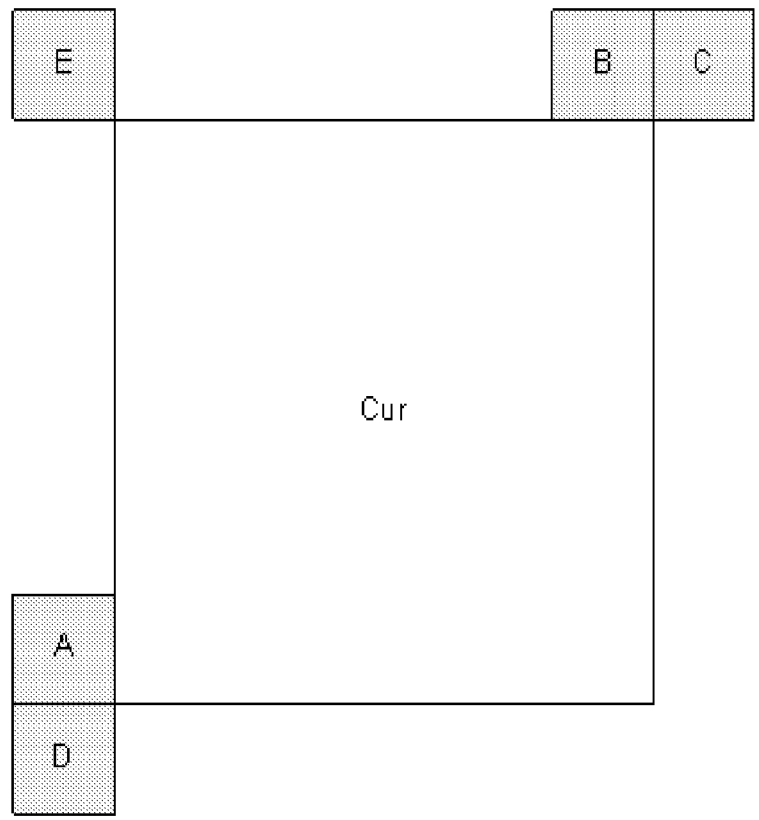
FIG. 8 illustrates an example of motion vector prediction candidates in an affine merge mode.

In Affine Merge mode, a CU-level flag indicates if a merge CU employs affine motion compensation. If so, then the first available neighboring CU that has been coded in an Affine mode is selected among the ordered set of candidate positions (A, B, C, D, E) as illustrated in FIG. 8 which shows motion vector prediction candidates in the Affine Merge mode.

Figure 9:
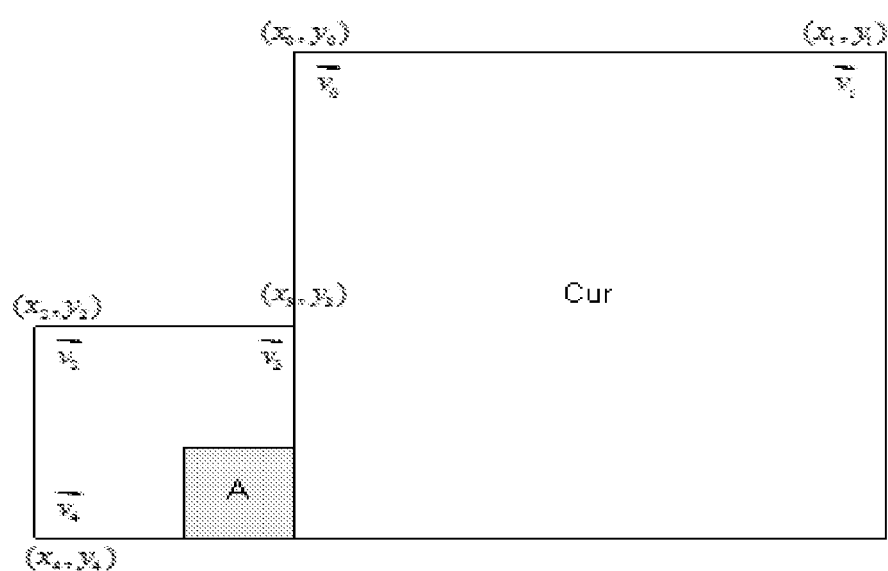
FIG. 9 illustrates spatial derivation of affine motion field control points in affine merge mode.

Once the first neighboring CU in Affine mode is obtained, then the three motion vectors $\vec{v_2}$, $\vec{v_3}$, and $\vec{v_4}$ from the top-left, top-right and bottom-left corners of the neighboring CU are retrieved as illustrated in FIG. 9. Based on these three vectors, the two CPMV of the top-left and top-right corners of current CU are derived as shown in Equation 2:

$$\circ \; \vec{v_0} = \vec{v_2} + (\vec{v_4} - \vec{v_2}) \left( \frac{Y_{curr} - Y_{neighb}}{H_{neighb}} \right) + (\vec{v_3} - \vec{v_2}) \left( \frac{X_{curr} - X_{neighb}}{W_{neighb}} \right) \quad \text{Equation 2}$$

$$\circ \; \vec{v_1} = \vec{v_0} + (\vec{v_3} - \vec{v_2}) \left( \frac{W_{curr}}{W_{neighb}} \right)$$

derivation of current *CU's CPMV* based on three corner motion vectors of the neighboring *CU*

When the control point motion vectors $\vec{v_0}$ and $\vec{v_1}$ of a current CU are obtained, the motion field inside the current CU is computed on a 4×4 sub-CU basis, through the model of Equation 1.

Block-based Local Illumination Compensation (LIC) can also be applied in the JEM. The LIC tool basically aims at predicting a variation of illumination which can occur between a predicted block and its reference block employed through motion compensated prediction. For each inter-mode coded CU, a LIC flag is signaled or implicitly derived to indicate the usage of the LIC. The LIC tool is based on a linear model for illumination changes, using a scaling factor a and an offset b, which are called LIC parameters. In a codec such as that of JEM, the LIC tool is disabled for an inter-mode coded CU which is employing the mentioned affine motion compensation.

Figure 10:
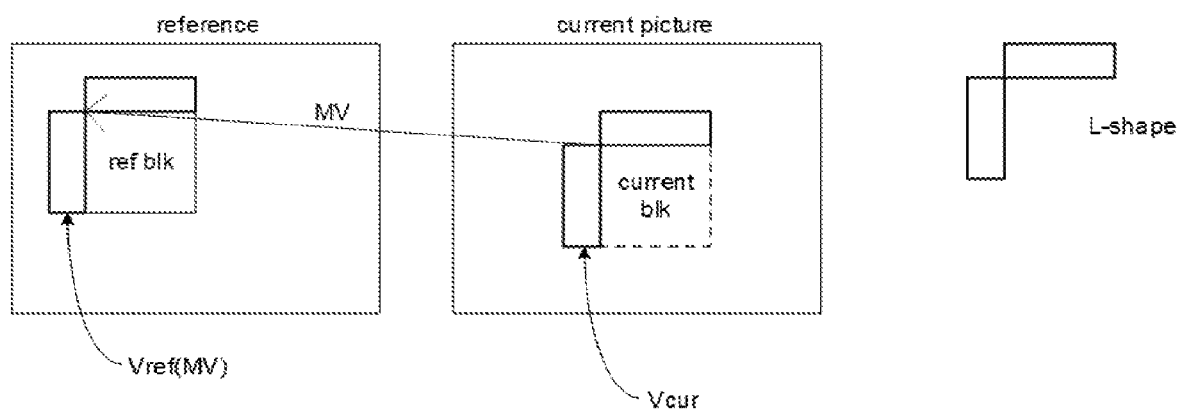
FIG. 10 illustrates an example of use of neighboring samples for deriving parameters associated with a local illumination compensation (LIC) model.

In inter mode, block-based Local Illumination Compensation (LIC) allows correcting block prediction samples obtained via motion compensation by considering the spatial or temporal local illumination variation. It is based on a model of illumination changes such as a first order linear model of illumination changes using a scaling factor a and an offset b. As depicted in FIG. 10, LIC parameters (a and b) can be estimated by comparing a set of reconstructed samples surrounding the current block ("current blk"), located in a neighborhood Vcur, with a set of reconstructed samples (the set can have various sizes depending on application), located in a neighborhood Vref(MV) of the reference block in the reference picture ("ref blk"). MV represents the motion vector between the current block and the reference block. Typically, Vcur and Vref(MV) comprise in samples located in the L-shape around (on the top, left and top-left side) the current block and reference block, respectively.

LIC parameters can be chosen based on any of various approaches. For example, LIC parameters can be selected based on minimizing a local distortion. One approach to minimizing local distortion can involve minimizing the mean square error (MSE) difference between the samples in Vcur and the corrected samples in Vref(MV). As an example, the LIC model can be a linear model, i.e., LIC(x)=a*x+b, where the parameters a and b can be determined based on minimizing MSE difference as in Equation 3:

$$(a_i, b_i) = \underset{(a,b)}{\arg\min} \left( \sum_{r \in Vcur, s \in Vref(MV)} (rec_{cur}(r) - a * rec_{ref}(s) - b)^2 \right) \quad \text{Equation 3}$$

local distortion for deriving *LIC* parameters where r and s correspond to pixel positions in Vcur and in Vref(MV), respectively. Another approach can involve using a Min-Max method. For example, as illustrated in FIG. 28, two reference samples (XA, XB) with minimal (Min) and maximal (Max) values and the associated reconstructed samples (YA, YB), e.g., at points A, B in FIG. 28, can be used to derive the slope "a" as in Equation 4.

$$a = \frac{Y_B - Y_A}{X_B - X_A} \quad \text{Equation 4}$$

derivation of *LIC* parameter "*a*" using Min–Max method.

Figure 28:
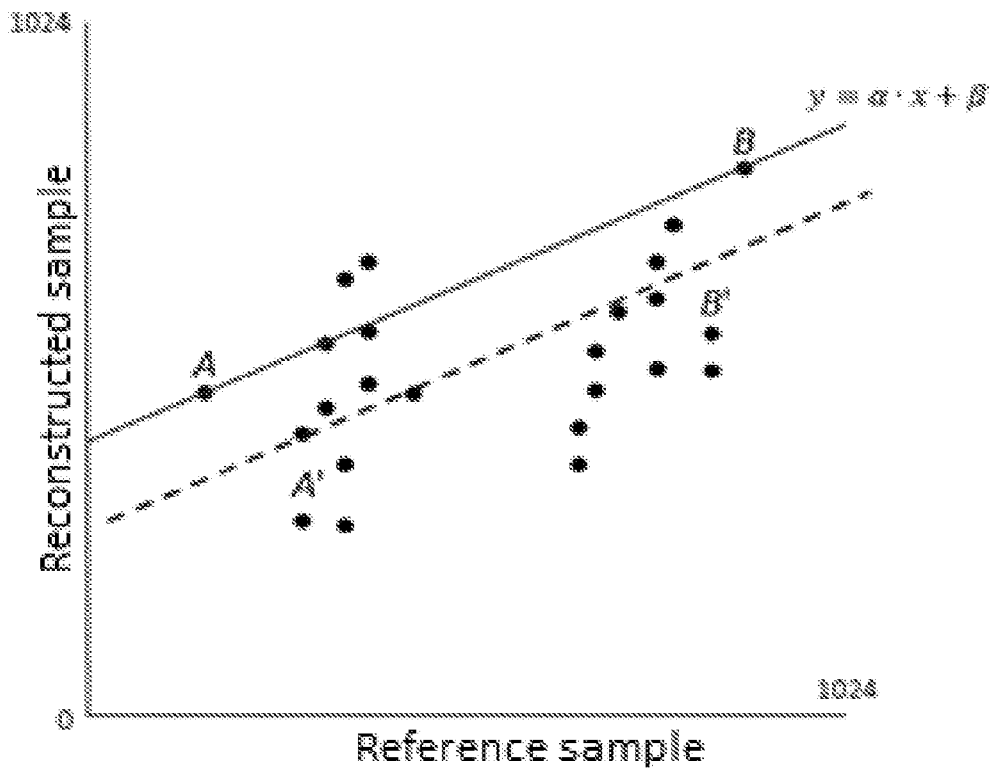
FIG. 28 illustrates an example of an embodiment to determine parameters of a local illumination compensation model.

A variant can involve also using second minimum and maximum points, e.g., points A', B' in FIG. 28, with averaging to increase the robustness.

Figure 11:
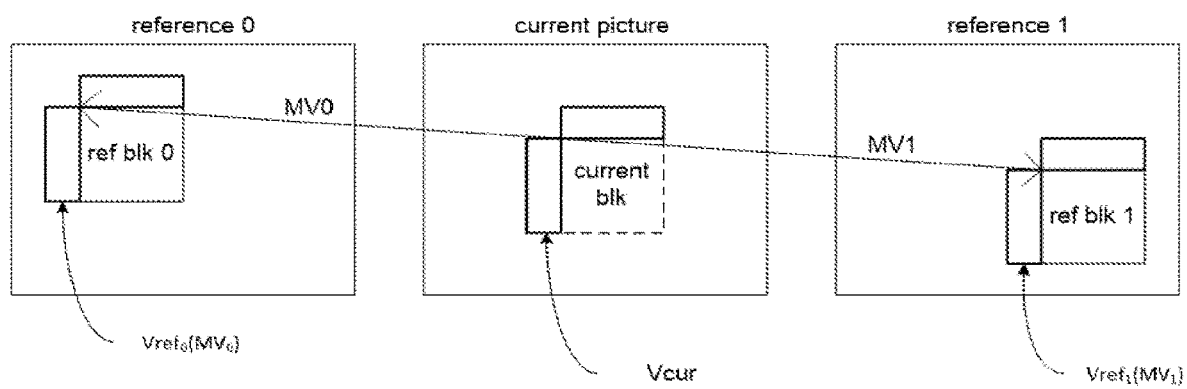
FIG. 11 illustrates an example of derivation of parameters for a LIC model in a bi-prediction mode.

In case of Bi-prediction, the LIC parameters $(a_0, b_0)$ and $(a_1, b_1)$ can be derived independently for $Vref_0(MV_0)$ and $Vref_1(MV_1)$ respectively. In other embodiments, the derivation may be dependent or interdependent. For example, as illustrated in FIG. 11, in Bi-Prediction, the L-shapes in references 0 and 1 are compared to the current block L-shape to derive the LIC parameters.

When a CU is coded with merge mode, the LIC flag can be copied from neighboring blocks, in a way similar to motion information copy in merge mode; otherwise, a LIC flag is signaled for the CU to indicate whether LIC applies or not. However, in an approach such as that of JEM, when a CU is using affine model (Affine AMVP, Affine Merge), its LIC flag is always set to be false.

At least one embodiment involves enabling a block-based local illumination compensation (LIC) tool when affine motion prediction is employed for an inter-mode coded Coding Unit (CU).

At least one embodiment involves activating the LIC tool for an inter-mode coded CU, which employs affine model to represent the motion vectors.

At least one embodiment involves activating the LIC tool, e.g., for an inter-mode coded CU using the affine model and can include the LIC flag decision for Affine AMVP and Affine Merge, and the corresponding LIC parameters derivation rules.

At least one embodiment involves how to activate the LIC tool and make related rules for inter-mode coded using affine motion prediction, in a way that provides good compression efficiency (rate distortion performance) together with a minimum complexity increase of the coding design.

At least one embodiment includes:
Determining the LIC flag for an inter-mode coded CU using the affine motion prediction. For Affine AMVP, an iteration loop over the LIC tool can be applied to decide the LIC flag, and the LIC flag signaled to the bitstream. Otherwise, for Affine Merge, the LIC flag can be obtained based on neighboring blocks, e.g., derived from affine control points associated with neighboring blocks, in a way similar to motion information copy in merge mode. [encoder/decoder]

At least one embodiment includes:

Based on determining the LIC flag is true, provide for deriving the corresponding LIC parameters. One or more features can be involved. For example, use a single motion vector of the first sub-block or any other sub-block (e.g., a central sub-block), or take multiple motion vectors of the sub-blocks in the first row/column into consideration, e.g., all motion vectors associated with sub-blocks of the first row/column or motion vectors associated with a subset of all motion vectors of the first row and/or the first column. As another example, generate a unique pair of LIC parameters for the entire CU. As another example, derive multiple pairs of LIC parameters. [encoder/decoder]

At least one embodiment improves a correction of block prediction samples based on considering an illumination variation, e.g., by enabling the LIC tool for an inter-mode coded CU using the affine motion prediction.

Various embodiments described herein provide for improving coding efficiency.

At least one embodiment is based on the inventors' recognition that an approach involving the LIC being deactivated in affine model cannot fully incorporate the potential performance due to the block prediction samples via affine motion compensation due to being not corrected by considering the illumination variation.

In general, at least one embodiment can involve LIC parameters being derived at the decoder side in accordance with one or more embodiments for deriving the parameters at the encoder side without requiring an extra bit to encode into the bitstream, thereby introducing no extra burden on bit rate. However, an embodiment may include one or more syntax elements inserted in the signaling.

In at least one embodiment, an affine MV can be computed for each 4×4 sub-block of the CU using affine model. This leads to the set of reconstructed samples in Vref(MV) that can be different for each sub-block with its own motion vector. One example for a 16×16 CU with affine model is presented in FIG. 12.

Figure 12:
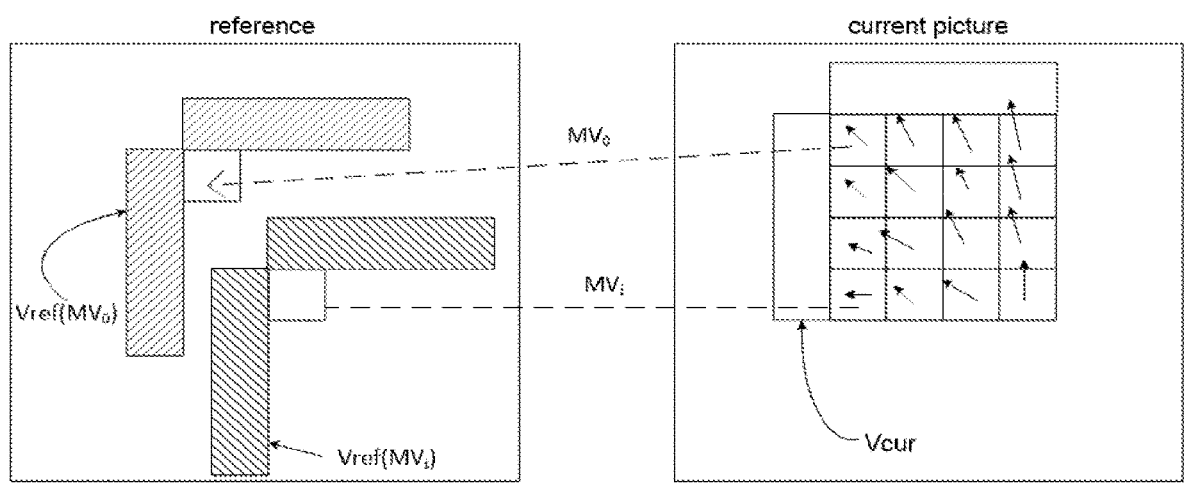
FIG. 12 illustrates an example of neighboring samples located in different L-shapes around blocks of a reference picture corresponding to sub-blocks of a current coding unit based on motion vectors associated with the sub-blocks.

In FIG. 12, an example of neighboring samples located in different L-shapes for a 16×16 CU using affine model is shown.

The current top-left sub-block ("current sub-blk$_0$"), is associated with $MV_0$, and its corresponding reconstructed samples are located in a neighborhood Vref($MV_0$) of its reference block in the reference picture ("ref blk$_0$"); in the meanwhile, for the current bottom-left sub-block ("current sub-blk$_i$") with $MV_i$, the reconstructed samples are located in a neighborhood Vref($MV_i$) of its reference block in the reference picture ("ref blk$_i$"). Vref($MV_0$) and Vref($MV_i$) can generate different L-shape around the related reference block. As described in detail below, the LIC parameters derivation can be adapted to the affine model based on various embodiments.

Figure 13:
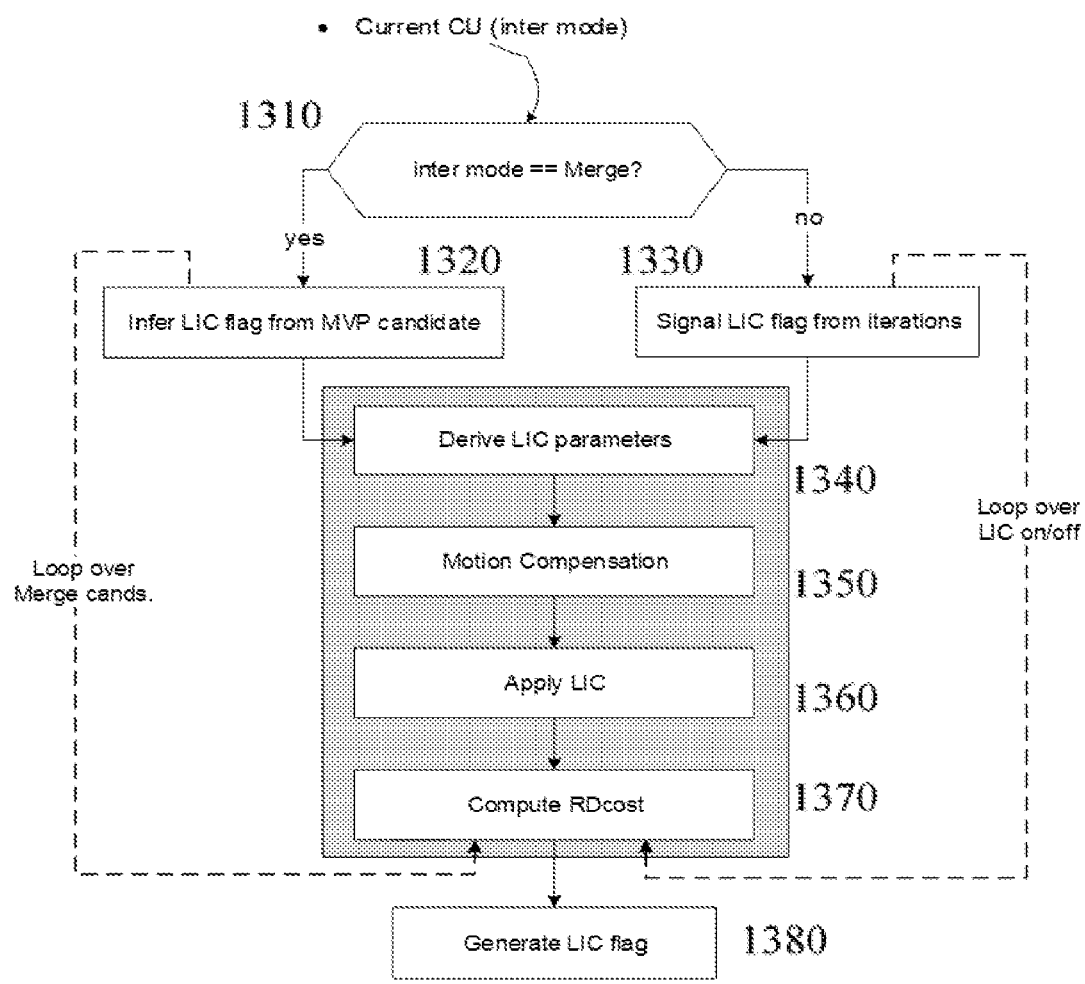
FIG. 13 illustrates an example of an embodiment of a portion of a video encoder.

FIG. 13 illustrates an example of an embodiment, e.g., in an encoder, of a method for determining the LIC flag for a CU in an inter slice. As can be seen, additional inter modes to employ the LIC tool include the Affine Merge and the Affine AMVP modes. For the Affine Merge mode, the LIC flag is inferred from neighboring blocks. For the Affine AMVP mode, a performance or quality metric, e.g., a rate distortion search, can be evaluated for a current CU. In the example of FIG. 13, such an evaluation includes deriving the LIC parameters at step 1340, performing motion compensation at step 1350, applying LIC at step 1360, and computing the cost, e.g., rate distortion cost at step 1370. As shown in FIG. 13, these steps are repeated in a loop over the LIC flag, i.e., LIC flag on and off. Thus, each possible LIC flag value is being evaluated from the rate distortion viewpoint for the current CU, both in Affine AMVP and AMVP modes. Once the LIC flag is determined, the flag can be signaled in the bitstream, e.g., using existing syntax for signaling LIC usage, thereby avoiding addition overhead for added syntax, or by adding syntax if appropriate for a particular environment, situation or application.

According to at least one embodiment, as for the Affine AMVP mode, the LIC flag of the current CU can be derived from its MVP candidates and/or from its neighboring MVPs.

At least one embodiment can derive the LIC parameters for the entire CU using only one motion vector. For example, this motion vector can be the motion vector of the first sub-block $MV_0(v_{0x}, v_{0y})$. At least one embodiment can comprise obtaining the set of reconstructed samples located in the same L-shape around the reference block; and after calculating the unique LIC parameters, apply them for all the sub-blocks in the current block.

Figure 14:
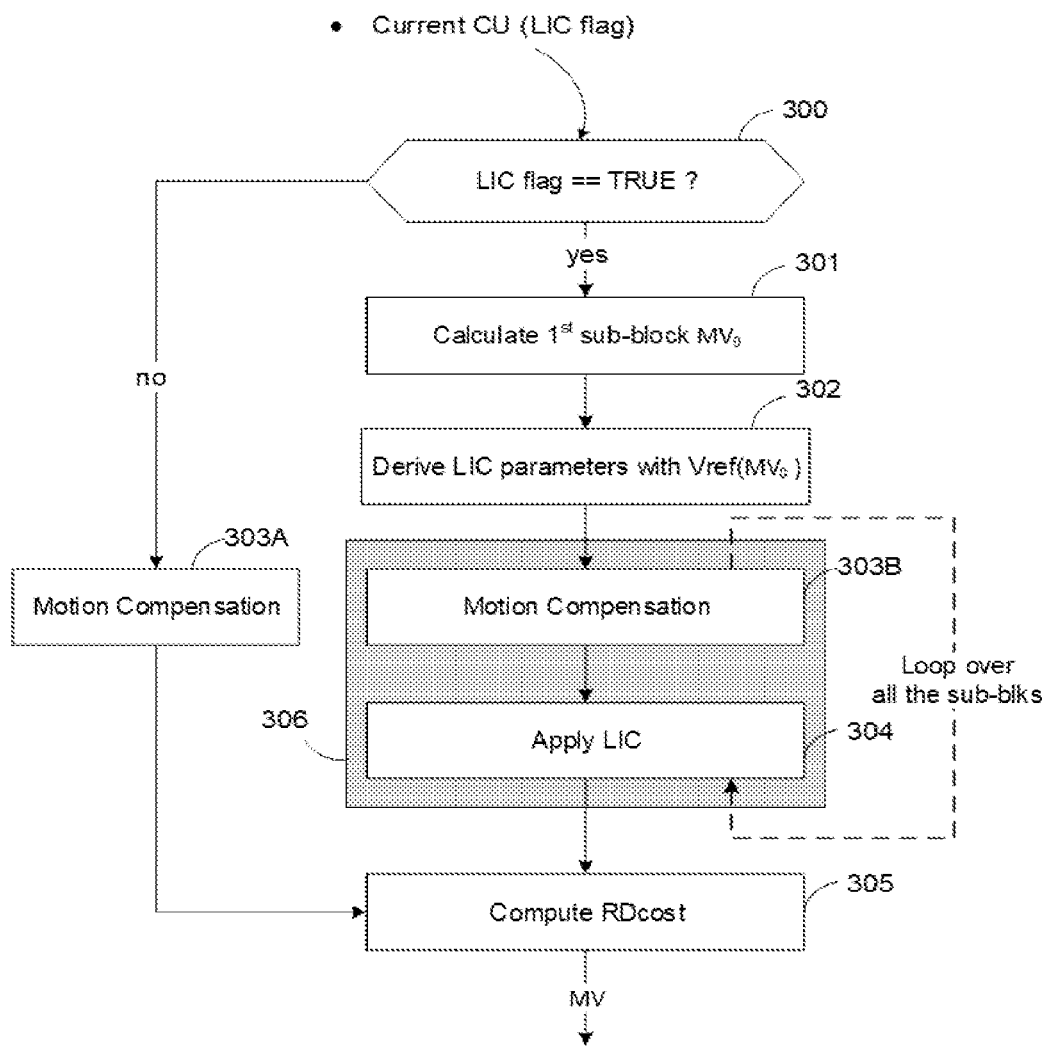
FIG. 14 illustrates an example of another embodiment of a portion of a video encoder.

An embodiment of a method for deriving LIC parameters for affine model using one motion vector is shown in FIG. 14. At step 300, the LIC flag is evaluated. If the LIC flag is false then motion compensation processing occurs at step 303A followed by step 305 where a performance metric such as a rate distortion (RD) analysis is performed. Motion vectors (MV) are provided at step 305 based on the metric analysis result. If the LIC flag is true at step 300 then processing continues at step 301 where the motion vector of the first sub-block $MV_0(v_{0x}, v_{0y})$ is calculated via Equation 1. Step 301 is followed by step 302 where the LIC parameters are derived by minimizing the local distortion per Equation 3 with the set of corrected samples in Vref($MV_0$). Step 302 is followed by block 306 which includes motion compensation processing at 303B (same motion compensation processing described previously in regard to 303A) followed by applying LIC at 304 based on the LIC parameters derived at 302. A loop over 306 is executed for each sub-block, wherein the LIC parameters obtained at 302 are employed at 304 for correcting the illuminance change for each sub-block. After completion of execution of the looping over 306, i.e., through steps 303B and 304, for all sub-blocks, processing continues at step 305 as described above.

As described, the example of an embodiment shown in FIG. 14 can involve a single motion vector corresponding to the first sub-block. However, in at least one other embodiment, the single motion vector can be calculated based on any sub-block other than the first sub-block, e.g., center, or for a neighboring block, etc. For the example of a single MV at a "center" of a coding unit, the single MV may be obtained or calculated based on one or more sub-blocks depending on an embodiment selected. Specific examples of embodiments for obtaining a single MV at the center of a CU are illustrated in FIGS. 25, 26 and 27.

Figure 25:
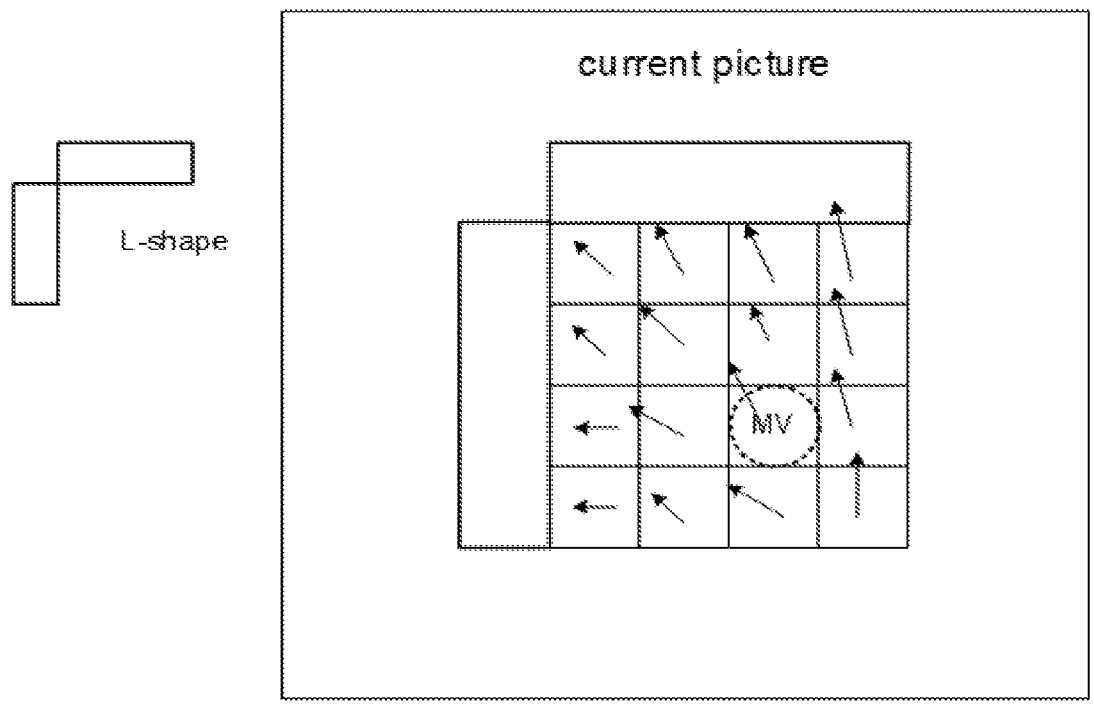
FIG. 25 illustrates an example of an embodiment of a motion vector at a center of a coding unit.
Figure 26:
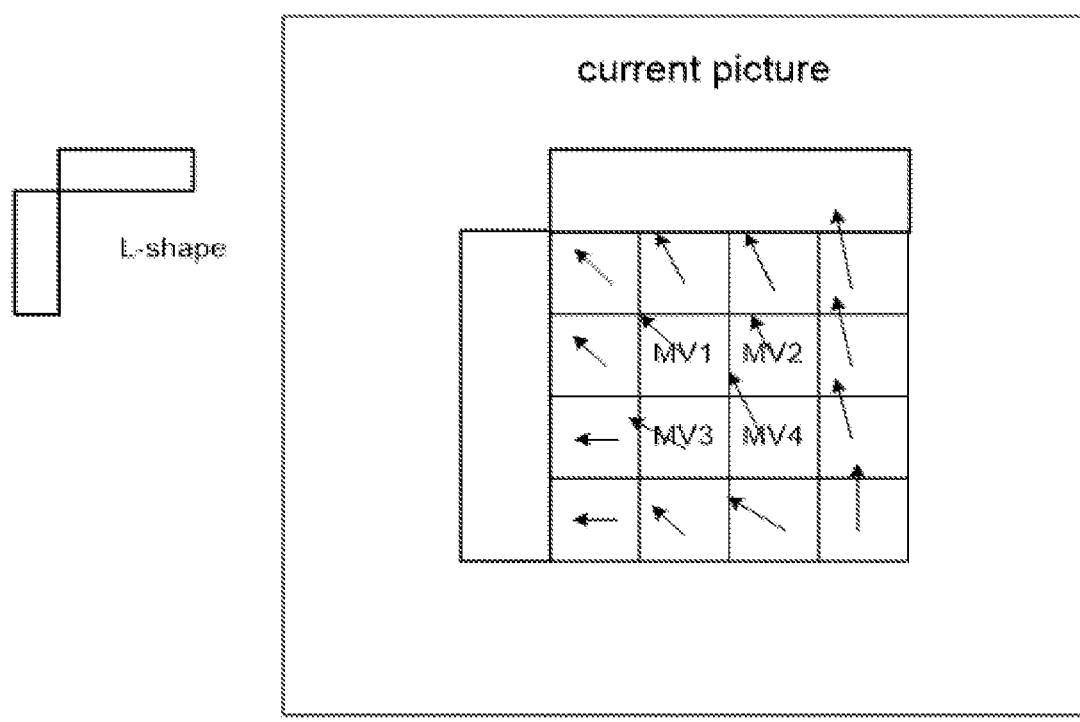
FIG. 26 illustrates another example of an embodiment of a motion vector at a center of a coding unit.

For example, in FIG. 25, the MV associated with the sub-block designated by a dashed circle within the sub-block can be a "center" or central MV based on selecting a sub-block that includes the point in the center of the coding unit, i.e., point (W/2, H/2) where W and H are the width and height of the coding unit, respectively. As another example, a MV at the "center" may be obtained by combining multiple MVs in the vicinity of the center, i.e., point (W/2, H/2). As an example, an embodiment shown in FIG. 26 combines the MVs of the four sub-blocks around point (W/2, H/2), labeled MV1, MV2, MV3 and MV4 in FIG. 26, by averaging the four MVs to provide a single motion vector that can be considered to be the center or central MV:

$$MV \text{ center} = \frac{MV1 + MV2 + MV3 + MV4}{4}$$

Figure 27:
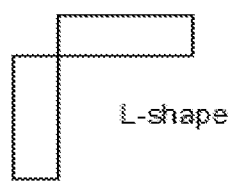
FIG. 27 illustrates another example of an embodiment of a motion vector at a center of a coding unit.
Figure 27:
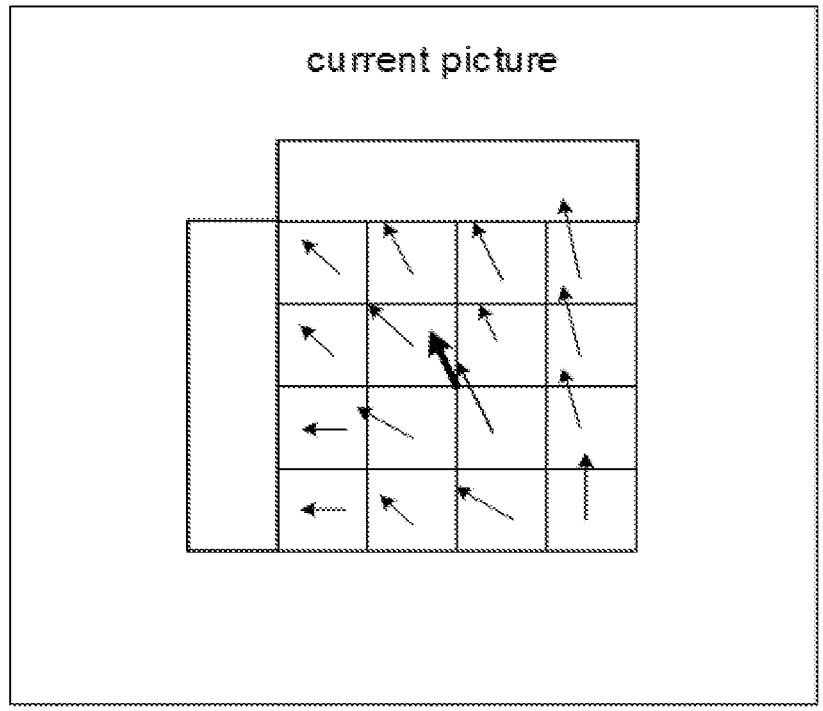

Another example is illustrated in FIG. 27 where a MV at the "center" such as that indicated by an arrow in bold may be obtained by calculating and applying the MV at the point (W/2, H/2) via the affine model with CPMV (control point motion vectors) $MV(v_{0x}, v_{0y})$, where $$MV(v_{W/2}, v_{H/2}) \begin{cases} v_{W/2} = \frac{(v_{1x} - v_{0x})}{2} - \frac{(v_{1y} - v_{0y})}{w} \times \frac{H}{2} + v_{0x} \\ v_{H/2} = \frac{(v_{1y} - v_{0y})}{w} \times \frac{H}{2} + \frac{(v_{1x} - v_{0x})}{2} + v_{0y} \end{cases}$$

An embodiment as described above can address different L-shapes around the reference block possibly being generated due to each sub-block having its own affine motion vector. However, the LIC parameters calculated via only one motion vector might not be optimal for all the sub-blocks because the illuminance variation between each sub-block and its reference blocks can be different. In general, at least one embodiment derives the LIC parameters for the entire CU by considering multiple motion vectors as the benchmarks. More specifically, instead of a complete L-shape around the reference block, a "quasi-L-shape" generated by several potentially unconnected patches is used. A quasi-L-shape can result because multiple motion vectors may refer to respective reconstructed samples that do not form a continuous L-shape data configuration.

Figure 15:
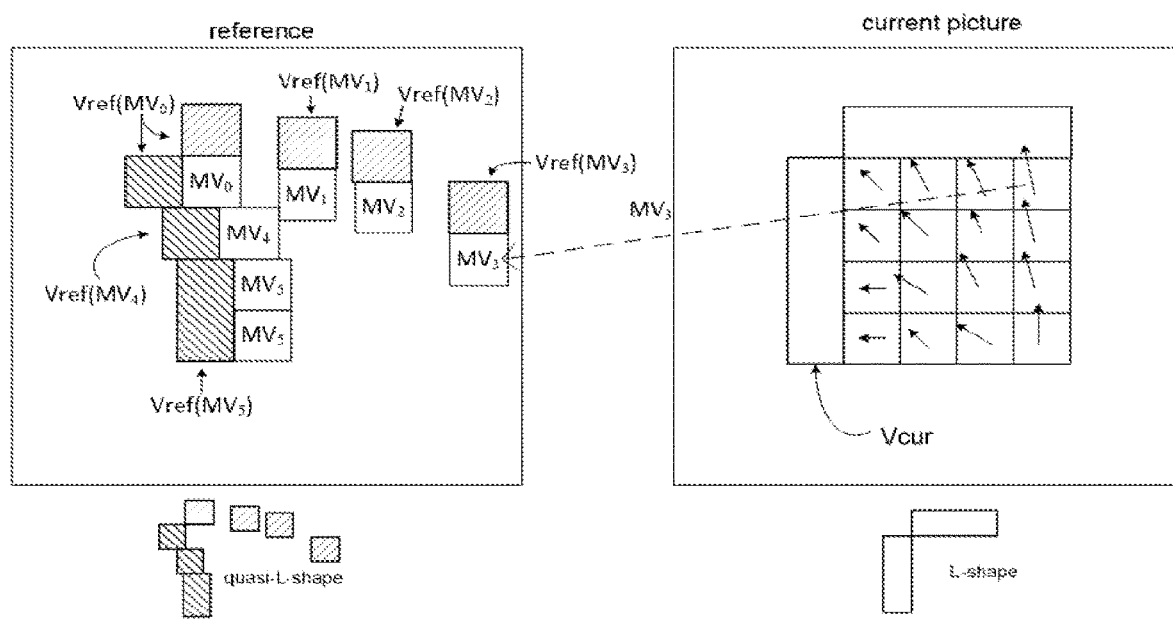
FIG. 15 illustrates an example of neighboring samples located in a quasi L-shape around blocks of a reference picture corresponding to sub-blocks of a current coding unit based on motion vectors associated with the sub-blocks.

For example, as depicted in FIG. 15, for the current top-left sub-block ("current sub-blk$_0$"), its corresponding reconstructed samples in Vref(MV$_0$) above the reference block MV$_0$ are used as the top-left corner patch of the "quasi-L-shape". Then the sub-blocks located in the first row of the CU (corresponding to reference blocks MV$_0$, MV$_1$, MV$_2$, and MV$_3$) generate the top patches of "quasi-L-shape" (Vref(MV$_0$), Vref(MV$_1$), Vref(MV$_2$), Vref(MV$_3$)). Further, the left patches of the "quasi-L shape" are formed by the sub-blocks in the first column (corresponding to reference blocks MV$_0$, MV$_4$, and MV$_5$) by using the reconstructed samples to the left of the reference blocks for the sub-blocks. An additional "Vref(MV$_0$)" is formed to the left of MV$_0$ in the reference. Note that Vref(MV$_5$) is shown as a double-block because the sub-blocks in the picture have the same motion vector MV$_5$. Using the "quasi-L-shape", the LIC parameters can be derived and then, for example, applied to the entire CU.

For example, one approach to minimizing local distortion with multiple motion vectors to choose the LIC parameters can be based on minimizing MSE difference in manner similar to that discussed above in regard to Equation 3, modified for the multiple motion vector case in Equation 5:

$$(a_i, b_i) = \underset{(a,b)}{\arg\min} \left( \sum_{\substack{r \in Vcur, s_0 \in Vref(MV_0), \\ s_1 \in Vref(MV_1) \ldots s_j \in Vref(MV_j)}} (rec_{cur}(r) - a*(rec_{ref}(s_0) + rec_{ref}(s_1) \ldots + rec_{ref}(s_j)) - b)^2 \right)$$

Equation 5 proposed local distortion for deriving LIC parameters with multiple MVs where r still corresponds to the L-shape pixel locations in Vcur; while s$_0$ correspond to pixel locations in Vref(MV$_0$), and s$_1$ correspond to pixel locations in Vref(MV$_1$). The following s$_j$ correspond to pixel locations in Vref(MV$_1$) consistently, until all the patches forming the "quasi-L-shape" are traversed. As discussed above in regard to Equation 4 for a single motion vector, another approach to obtaining the LIC model parameters for multiple motion vectors can involve using a Min-Max method.

Figure 16:
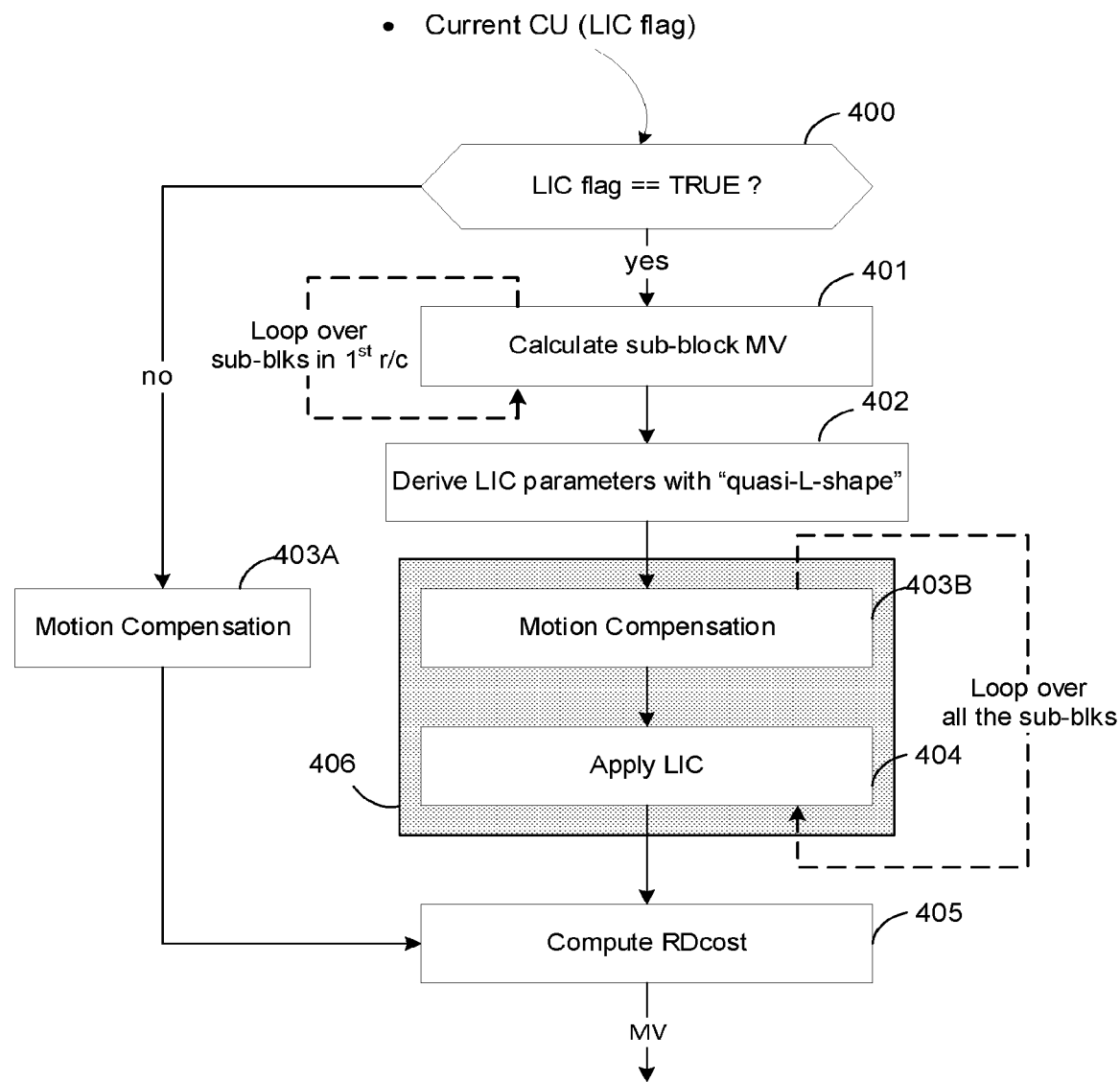
FIG. 16 illustrates an example of another embodiment of a portion of a video encoder.

At least one embodiment of a method to derive the LIC parameters using multiple motion vectors is depicted in FIG. 16. At step 401, the motion vectors of the sub-blocks in the first row and column are generated via Equation 1 by looping over the sub-blocks in the first row and first column. At step 402, when the LIC flag is true, the LIC parameters can be derived by minimizing the local distortion using Equation 4 with the "quasi-L-shape" around the reference block. Processing at step 403 and 404 proceeds in a manner similar to that described above in regard to steps 303 and 304 of FIG. 14.

In at least one embodiment, to reduce the complexity, the "quasi-L-shape" can also be generated with only two motion vectors, e.g., top and left separately. A first motion vector comes from the top row, e.g., sub-block in the middle position of the first row, and a second motion vector comes from the first column, e.g., sub-block in the middle position of the first column.

In at least one embodiment, the "quasi-L-shape" can be generated using a subset of the plurality of motion vectors associated with the first row and/or first column of sub-blocks of a coding unit. For example, the quasi-L-shape can be formed based on reconstructed samples obtained using motion vectors associated with one or more of a subset of sub-blocks in the first row of sub-blocks or a subset of sub-blocks in the first column of sub-blocks. That is, a first set of motion vectors can comprise motion vectors associated with each of the sub-blocks included in a first row of sub-blocks in a coding unit and a second set of motion vectors can comprise motion vectors associated with each of the sub-blocks included in a first column of sub-blocks included in the coding unit. A quasi-L-shape can be generated based on reconstructed samples produced based on one or more of a first subset of the first set of motion vectors or a second subset of the second set of motion vectors, i.e., based on the first subset, or the second subset, or both the first and second subsets. For the example described above involving a sub-block in the middle position of the first row and/or middle position of the first column of sub-blocks, the described first and/or second subsets of motion vectors may each include one motion vector associated with the respective sub-block in the middle of the first row and/or column.

In at least one embodiment described above, only one pair of LIC parameters (a and b) are derived and used for the entire CU. In at least one other embodiment, the LIC tool for affine model can involve multiple sets or a plurality of sets of LIC parameters, e.g., a plurality of pairs of LIC parameters for a linear LIC model, can be generated for use with an affine motion model to correct the prediction samples more accurately. Because the LIC parameters can be derived at the decoder side in the same way, adding sets of LIC parameters does not require adding syntax bits to encode into the bitstream, which indicates no extra burden on bit rate.

Figure 17:
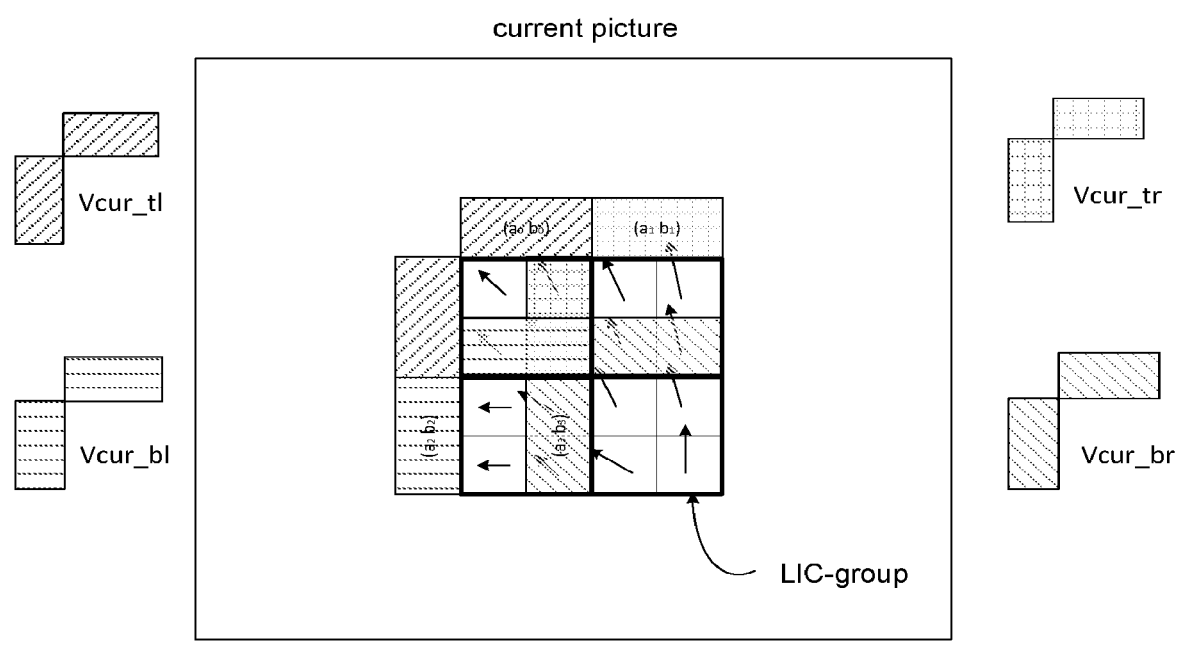
FIG. 17 illustrates an example of neighboring samples located in different L-shapes around blocks of a reference picture corresponding to groups of sub-blocks of a current coding unit based on motion vectors associated with the groups of sub-blocks.

As an example, FIG. 17 illustrates another embodiment wherein 1) several sub-blocks can be grouped into a larger sub-block (referred to as "LIC-group" herein); 2) a CU can be divided into a plurality of LIC-groups, e.g., into four LIC-groups (top-left, top-right, bottom-left, bottom-right); 3) one pair of LIC parameters can be derived associated with each LIC-group; 4) during motion compensation, the illuminance change of samples in the sub-block is corrected with the corresponding LIC parameters for the LIC-group the sub-block belongs to.

When calculating a pair of LIC parameters for each LIC-group, one or more embodiments described herein can also be applied. In an embodiment, the L-shape around the current LIC-group (Vcur_tl/Vcur_tr/Vcur_bl/Vcur_br) is applied instead of the L-shape around the current CU (Vcur). In an embodiment, a CU can be divided into more\ fewer than 4 LIC-groups. In an embodiment, a CU can be divided into different numbers of LIC-groups depending on the size of the CU. For example, if the size of CU is 16×16 or 32×32, 4 LIC-groups are generated; and a 64×64 CU can be split into 8 LIC-groups.

Figure 18:
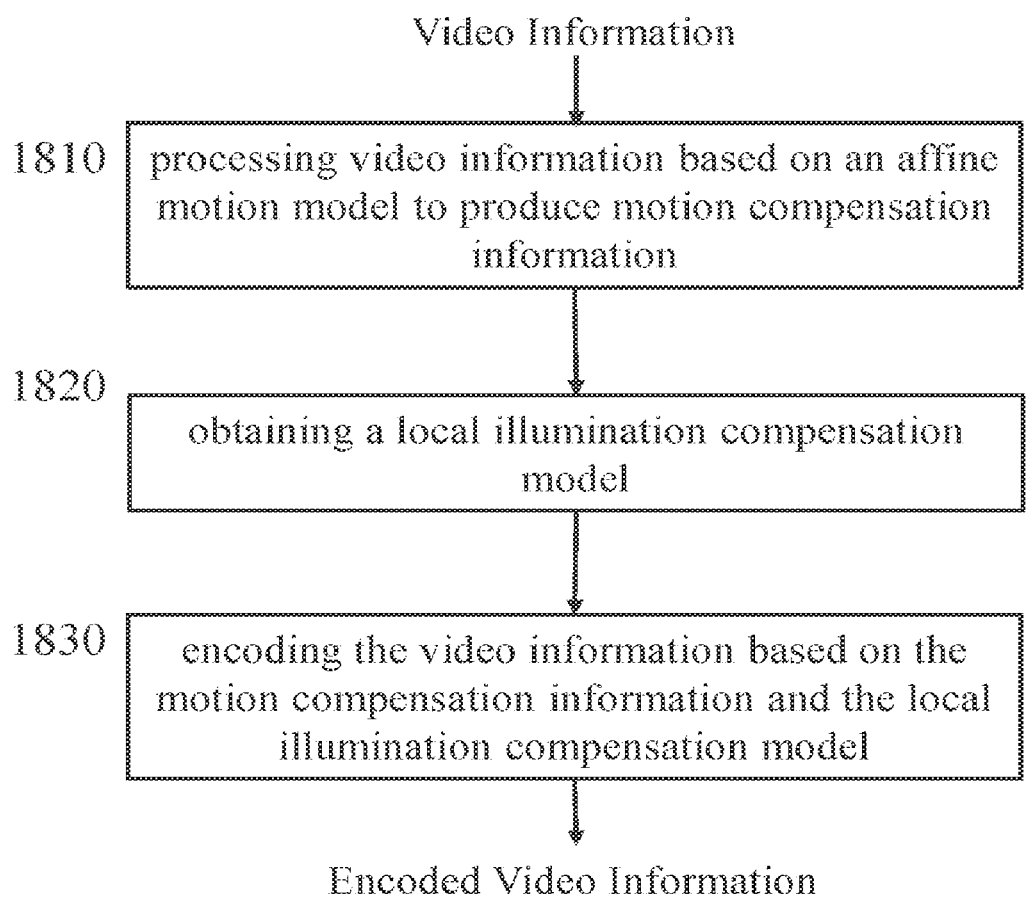
FIG. 18 illustrates another example of an embodiment of a portion of a video encoder.

Another example of an embodiment of a portion of an encoder is illustrated in FIG. 18. In FIG. 18, video information such as video data including a picture part is processed at step 1810 based on an affine motion model to produce motion compensation information. At step 1820, a local illumination compensation (LIC) model is obtained, e.g., parameters of a linear model are derived in accordance with one or more aspects or embodiments as described herein. Then, at step 1830, the video information is encoded to produce encoded video information based on the motion compensation information and the LIC model.

Figure 19:
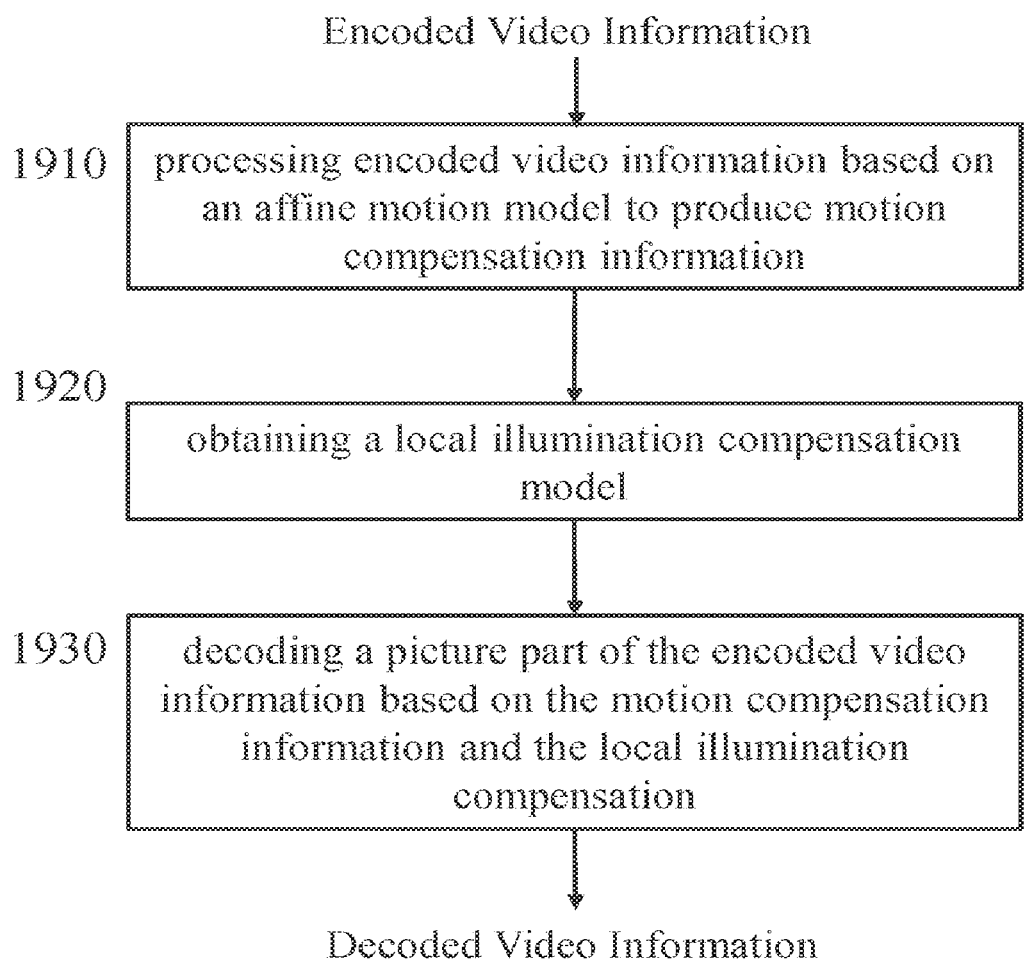
FIG. 19 illustrates an example of an embodiment of a portion of a video decoder.

An example of an embodiment of a part or portion of a decoder in accordance with one or more aspects of the present disclosure is illustrated in FIG. 19. In FIG. 19, encoded video information such as video data including an encoded picture part is processed at step 1910 based on an affine motion model to produce motion compensation information. At step 1920, a local illumination compensation (LIC) model is obtained, e.g., parameters of a linear model are derived in accordance with one or more aspects or embodiments as described herein. Then, at step 1930, the video information is decoded to produce a decoded picture part based on the motion compensation information and the LIC model.

Figure 20:
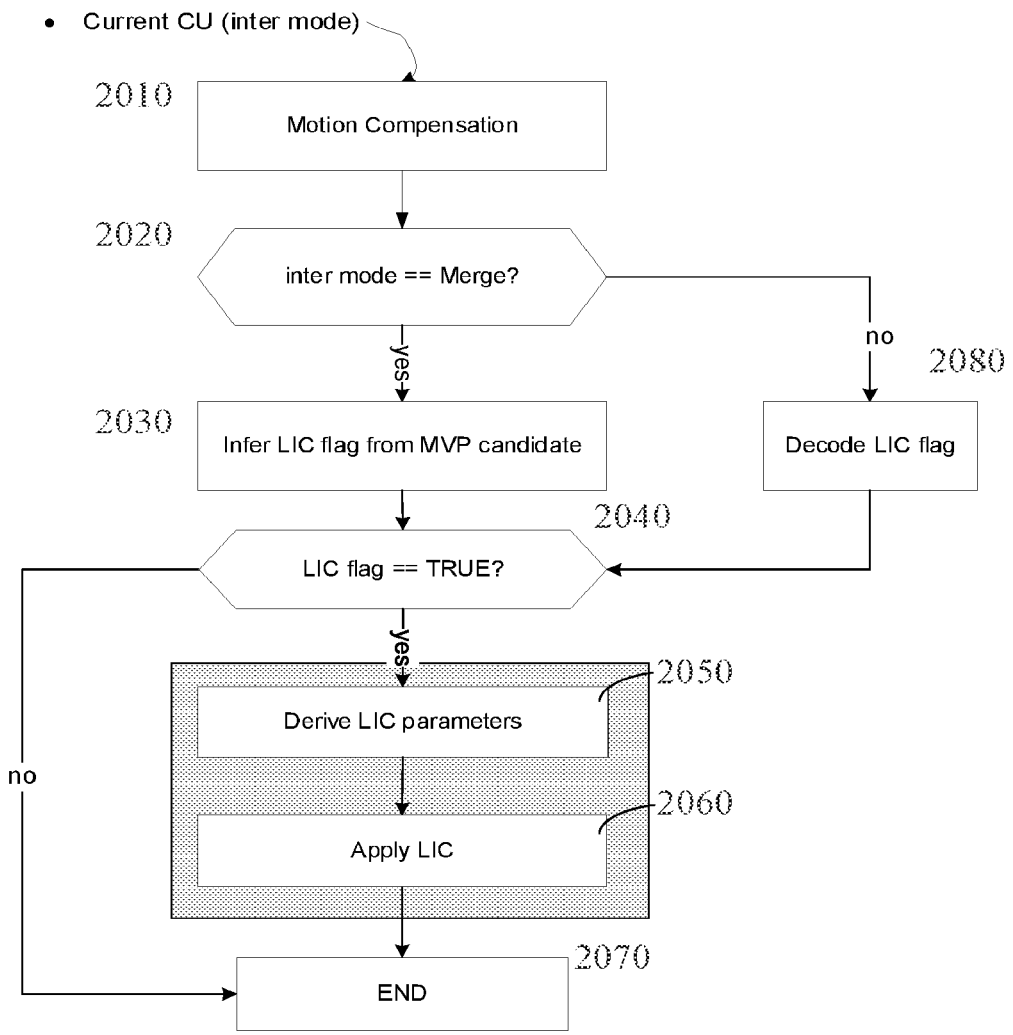
FIG. 20 illustrates another example of an embodiment of a portion of a video decoder.
Figure 21:
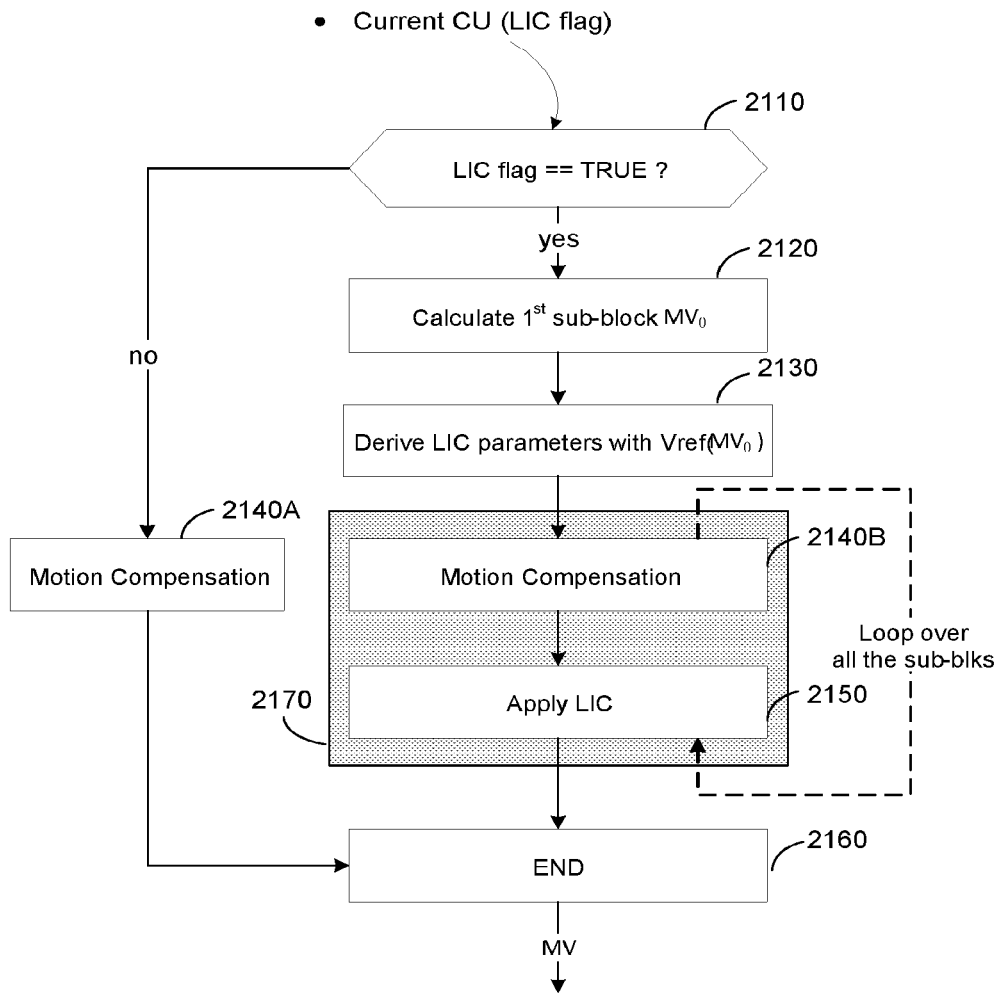
FIG. 21 illustrates another example of an embodiment of a portion of a video decoder.
Figure 22:
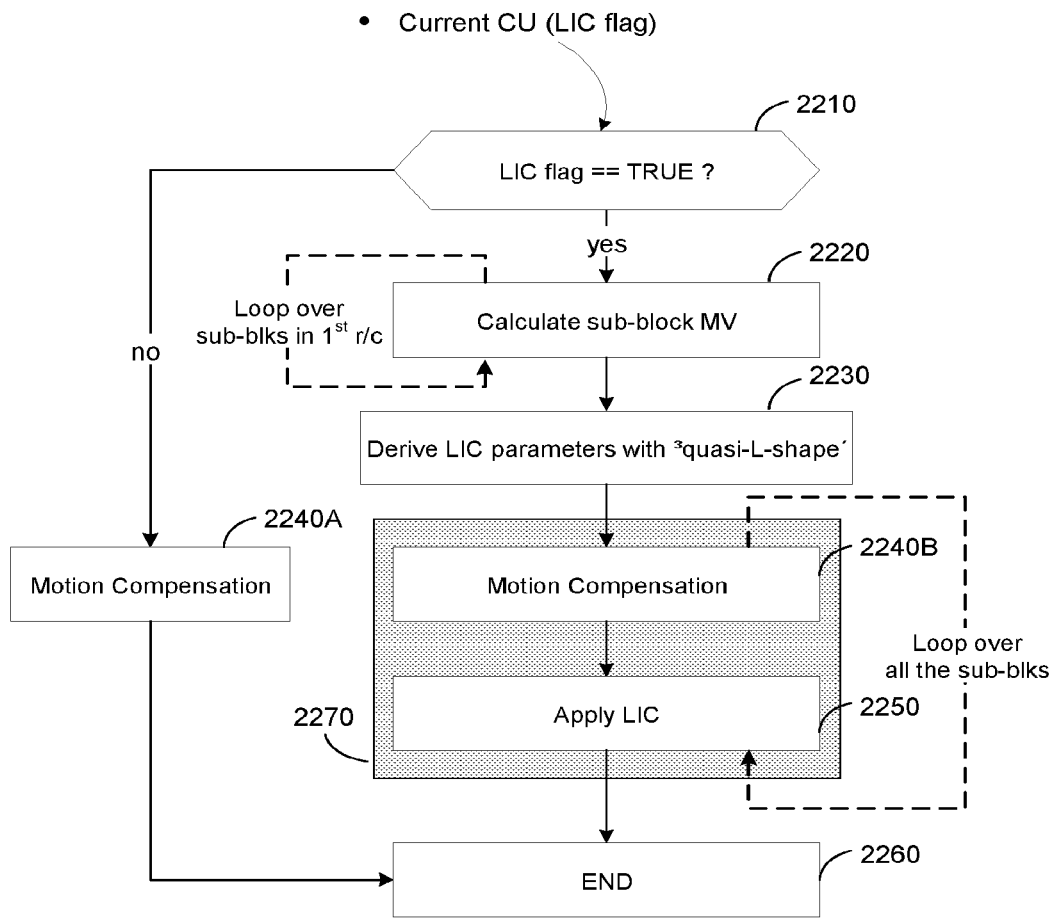
FIG. 22 illustrates another example of an embodiment of a portion of a video decoder.
Figure 23:
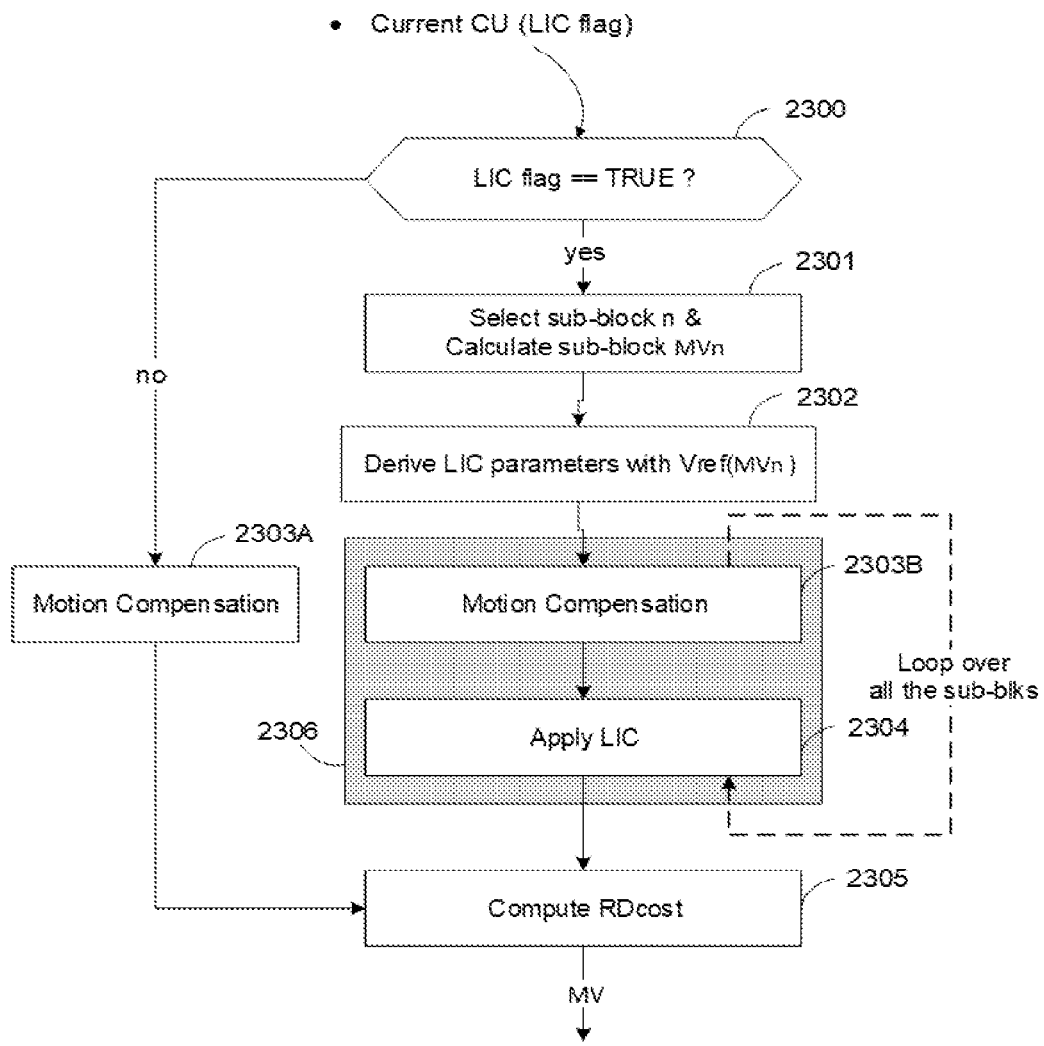
FIG. 23 illustrates another example of an embodiment of a portion of a video encoder.
Figure 24:
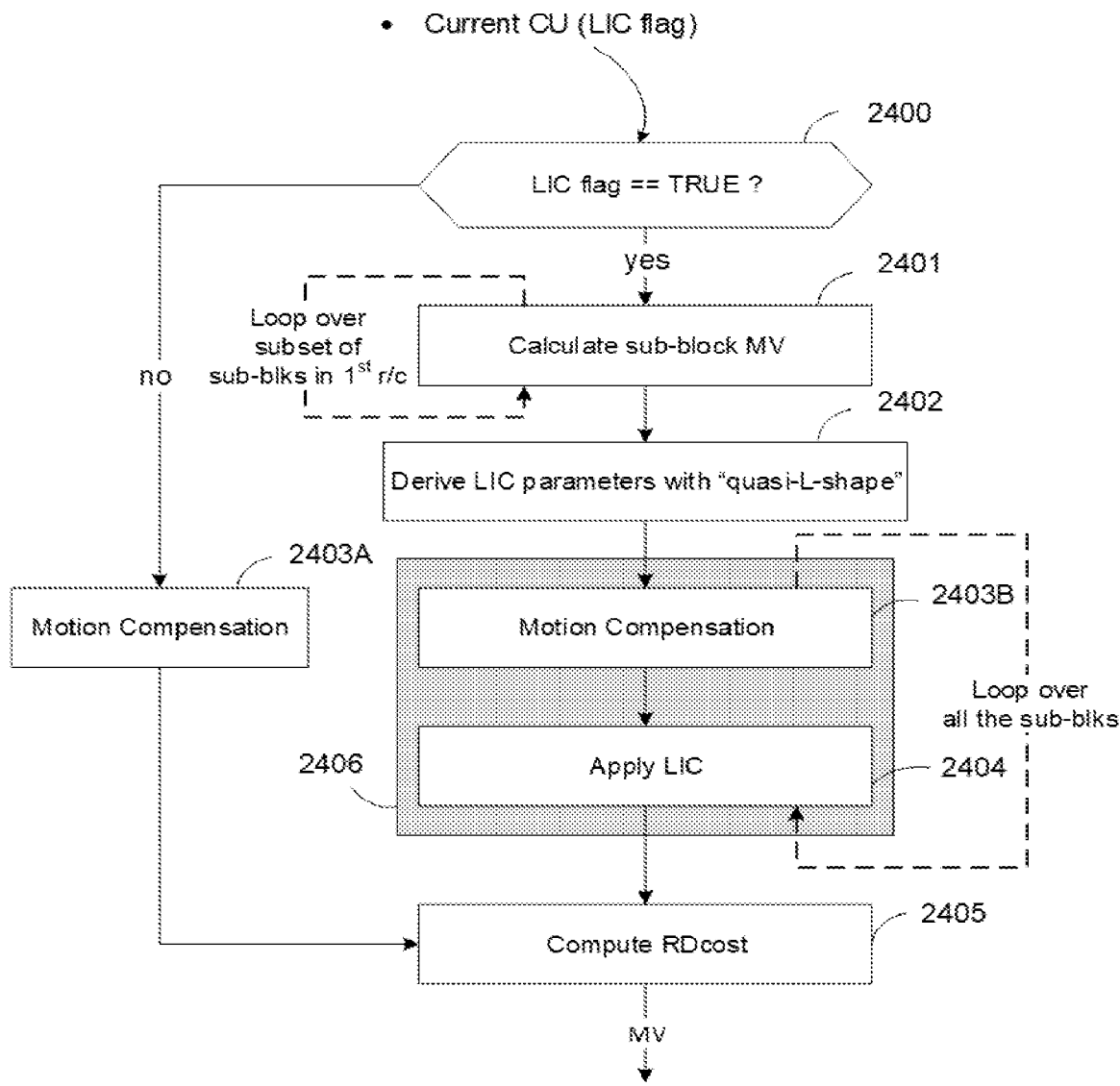
FIG. 24 illustrates another example of an embodiment of a portion of a video encoder.

FIGS. 20, 21 and 22 illustrate additional examples of embodiments of part of a decoder. In FIG. 20, motion compensation processing of a current CU that is inter-mode coded occurs at step 2010. Step 2020 determines whether the inter mode is a merge mode. If so, the LIC flag is inferred at step 2030 as described herein. If not, the LIC flag is decoded at step 2080. Both step 2020 and step 2080 are followed by step 2040 where the state of the LIC flag is tested. If the LIC flag is false then LIC is not applied and processing regarding LIC ends at step 2070. If the LIC flag is determined to be true at step 2040 then LIC parameters are derived at step 2050. At step 2060 LIC is applied based on those parameters for all of the current CU after which processing ends at step 2070.

In FIG. 21, the LIC flag for a current CU is tested at step 2110. If false, the LIC processing is disabled or not active for the current CU and motion compensation processing occurs at step 2170 followed by the end of LIC-related processing at step 2160. If the LIC flag is true at step 2110 then the motion vector corresponding to one sub-block is calculated, determined or obtained, e.g., $MV_0$ corresponding to the first sub-block. Next, the LIC model is obtained at step 2130 by deriving LIC parameters based on the motion vector and the associated reference block, e.g., $V_{ref}(MV_0)$. Then, motion compensation at step 2140 and LIC at step 2150 are applied. Steps 2140 and 2150 are repeated as a loop over all of the sub-blocks to apply the LIC model based on the parameters determined from the single motion vector to all the sub-blocks. After the loop over all the sub-blocks is completed, processing ends at step 2160.

In FIG. 22, the LIC flag for a current CU is tested at step 2210. If false, the LIC processing is disabled or not active for the current CU and motion compensation processing occurs at step 2270 followed by the end of LIC-related processing at step 2260. If the LIC flag is true at step 2210 then at step 2220 a plurality of motion vectors corresponding to a plurality of sub-blocks comprising, for example, a subset of sub-blocks in the first row and/or a subset of sub-blocks in the first column are calculated, determined or obtained by looping over the sub-blocks included in the one or more subsets of sub-blocks. Step 2220 is followed by step 2230 where the LIC parameters are derived based on a plurality of reference blocks associated with the plurality of motion vectors. As described above, the plurality of reference blocks may have a data configuration designated as a quasi-L-shape. Then, motion compensation processing occurs at step 2240 and LIC processing is applied at step 2250 where LIC is based on the LIC parameters determined at step 2230. Steps 2240 and 2250 are repeated as a loop over all of the sub-blocks to apply the LIC model to all the sub-blocks. After the loop over all the sub-blocks is completed, processing ends at step 2260.

One or more embodiments to derive the proposed LIC parameters for affine model as described herein can also be performed for other sub-CU based motion vector prediction (i.e., "subblock-based temporal merging candidates": Alternative Temporal Motion Vector Prediction (ATMVP), and Spatial-Temporal Motion Vector Prediction (STMVP), and Subblock-based Temporal Motion Vector Prediction (SbTMVP)) when the LIC tool is activated.

In addition, although various aspects and embodiments have been described in regard to video information processing for inter-mode or inter coding and a linear model associated with LIC, one or more aspects, embodiments and features may also apply to intra-mode or intra coding. For example, for cross-component linear model (CCLM) in intra-coding, the luma samples are used to predict the corresponding chroma samples based on a linear model, and the parameters of the linear model can be derived or obtained in accordance with one or more aspects described herein in regard to LIC.

Also, if there are several sub-blocks inside one CU, each sub-block could have different corresponding referred sub-block. Therefore, one or more described embodiments could also be applied for such case.

The embodiments can be carried out by computer software implemented, e.g., by the processor 1010 of system 1000 in FIG. 3 or by hardware, or by a combination of hardware and software. As a non-limiting example, the embodiments can be implemented by one or more integrated circuits. The memory 1020 included in the example of a system 1000 shown in FIG. 3 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium, e.g., a non-transitory computer-readable medium.

In general, at least one embodiment can involve a method of encoding video information comprising processing the video information based on an affine motion model to produce motion compensation information; obtaining a local illuminati on compensation model; and encoding the video information based on the motion compensation information and the local illumination compensation model.

At least one embodiment can involve apparatus for encoding video information comprising one or more processors, wherein the one or more processors are configured to process the video information based on an affine motion model to produce motion compensation information; obtain a local illumination compensation model; and encode the video information based on the motion compensation information and the local illuminati on compensation model.

At least one embodiment can involve a method of decoding video information comprising processing the video information based on an affine motion model to produce motion compensation information; obtaining a local illumination compensation model; and decoding the video information based on the motion compensation information and the local illumination compensation model.

At least one embodiment can involve apparatus for decoding video information comprising one or more processors, wherein the one or more processors are configured to process the video information based on an affine motion model to produce motion compensation information; obtain a local illumination compensation model; and encode the video information based on the motion compensation information and the local illuminati on compensation model.

At least one embodiment can involve a method or apparatus as described herein, wherein obtaining the local illumination compensation model comprises determining at least one model parameter of a linear model of illumination changes in the video information based on at least one motion vector included in the motion compensation information.

An example of an embodiment of a method can comprise processing video information based on an affine motion model to produce motion compensation information; obtaining a local illumination compensation model; and encoding the video information based on the motion compensation information and the local illumination compensation model; wherein obtaining the local illumination compensation model comprises determining at least one model parameter of a linear model of illumination changes in the video information based on a plurality of motion vectors included in the motion compensation information; and the video information comprises a coding unit having a plurality of sub-blocks including a first row of sub-blocks and a first column of sub-blocks; and the plurality of motion vectors comprises a group of motion vectors associated with respective ones of each sub-block included in the first row of sub-blocks and each sub-block included in the first column of sub-blocks; and determining the at least one model parameter comprises obtaining a set of reconstructed samples forming a quasi L-shape based on the group of motion vectors; and evaluating a local distortion based on the set of reconstructed samples.

Another example of an embodiment of a method can comprise processing video information based on an affine motion model to produce motion compensation information; obtaining a local illumination compensation model; and encoding the video information based on the motion compensation information and the local illumination compensation model; wherein the video information comprises a coding unit having a plurality of sub-blocks including a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and obtaining the local illumination compensation model comprises determining at least one model parameter of a linear model of illumination changes in the video information based on one or more of a first subset of the first set of motion vectors or a second subset of the second set of motion vectors; and determining the at least one model parameter comprises obtaining a set of reconstructed samples forming a quasi L-shape based on the one or more of the first subset of the first set of motion vectors or the second subset of the second set of motion vectors; and evaluating a local distortion based on the set of reconstructed samples.

Another example of an embodiment of a method can comprise processing video information based on an affine motion model to produce motion compensation information; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the video information comprises a coding unit having a plurality of sub-blocks; and the first motion vector is associated with a first one of the plurality of sub-blocks located in the upper left corner of the coding unit; and determining the at least one model parameter comprises obtaining a set of reconstructed samples forming an L-shape based on the first motion vector; and evaluating a local distortion based on the set of reconstructed samples.

Another example of an embodiment of a method can comprise processing video information based on an affine motion model to produce motion compensation information; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a center of the coding unit; and determining the at least one model parameter comprises obtaining a set of reconstructed samples forming an L-shape based on the first motion vector; and evaluating a local distortion based on the set of reconstructed samples.

Another example of an embodiment of a method can comprise processing video information based on a coding unit comprising a plurality of sub-blocks to produce motion compensation information comprising a plurality of motion vectors associated with respective ones of the plurality of sub-blocks; obtaining a local illumination compensation model; and encoding the video information based on the motion compensation information and the local illumination compensation model; wherein obtaining the local illumination compensation model comprises determining at least one model parameter of a linear model of illumination changes in the video information based on at least one of the plurality of motion vectors; and the plurality of sub-blocks included in the coding unit comprises a first row of sub-blocks and a first column of sub-blocks; and the plurality of motion vectors comprises a group of motion vectors associated with respective ones of each sub-block included in the first row of sub-blocks and each sub-block included in the first column of sub-blocks; and determining the at least one model parameter comprises obtaining a set of reconstructed samples forming a quasi L-shape based on the group of motion vectors; and evaluating a local distortion based on the set of reconstructed samples.

Another example of an embodiment of a method can comprise processing video information based on a coding unit comprising a plurality of sub-blocks to produce motion compensation information; obtaining a local illumination compensation model; and encoding the video information based on the motion compensation information and the local illumination compensation model; wherein the plurality of sub-blocks included in the coding unit comprises a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and obtaining the local illumination compensation model comprises determining at least one model parameter of a linear model of illumination changes in the video information based on one or more of a first subset of the first set of motion vectors and a second subset of the second set of motion vectors; and; and determining the at least one model parameter comprises obtaining a set of reconstructed samples forming a quasi L-shape based on the one or more of the first subset of the first set of motion vectors or the second subset of the second set of motion vectors; and evaluating a local distortion based on the set of reconstructed samples.

Another example of an embodiment of a method can comprise processing video information based on a coding unit comprising a plurality of sub-blocks to produce motion compensation information comprising a plurality of motion vectors associated with respective ones of the plurality of sub-blocks; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a first one of the plurality of sub-blocks located in an upper left corner of the coding unit; and determining the at least one model parameter comprises obtaining a set of reconstructed samples forming an L-shape based on the first motion vector; and evaluating a local distortion based on the set of reconstructed samples.

Another example of an embodiment of a method can comprise processing video information based on a coding unit comprising a plurality of sub-blocks to produce motion compensation information comprising a plurality of motion vectors associated with respective ones of the plurality of sub-blocks; obtaining a local illumination compensation model; and encoding the video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a center of the coding unit; and determining the at least one model parameter comprises obtaining a set of reconstructed samples forming an L-shape based on the first motion vector; and evaluating a local distortion based on the set of reconstructed samples.

An example of an embodiment of apparatus can comprise one or more processors, wherein the one or more processors are configured to process video information based on an compensation model; and encode the video information based on the motion compensation information and the local illumination compensation model; wherein to obtain the local illumination compensation model the one or more processors are further configured to determine at least one model parameter of a linear model of illumination changes in the video information based on a plurality of motion vectors included in the motion compensation information; wherein the video information comprises a coding unit having a plurality of sub-blocks including a first row of sub-blocks and a first column of sub-blocks; and the plurality of motion vectors comprises a group of motion vectors associated with respective ones of each sub-block included in the first row of sub-blocks and each sub-block included in the first column of sub-blocks; and to determine the at least one model parameter the one or more processors are further configured to obtain a set of reconstructed samples forming a quasi L-shape based on the group of motion vectors; and evaluate a local distortion based on the set of reconstructed samples.

Another example of an embodiment of apparatus can comprise one or more processors, wherein the one or more processors are configured to process video information based on an affine motion model to produce motion compensation information; obtain a local illumination compensation model; and encode the video information based on the motion compensation information and the local illumination compensation model; wherein the video information comprises a coding unit having a plurality of sub-blocks including a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and to obtain the local illumination compensation model the one or more processors are further configured to determine at least one model parameter of a linear model of illumination changes in the video information based on one or more of a first subset of the first set of motion vectors or a second subset of the second set of motion vectors; and to determine the at least one model parameter the one or more processors are further configured to obtain a set of reconstructed samples forming a quasi L-shape based on the one or more of the first subset of the first set of motion vectors or the second subset of the second set of motion vectors; and evaluate a local distortion based on the set of reconstructed samples.

Another example of an embodiment of apparatus can comprise one or more processors, wherein the one or more processors are configured to process video information based on an compensation model; and encode the video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; and wherein the video information comprises a coding unit having a plurality of sub-blocks; and the first motion vector is associated with a first one of the plurality of sub-blocks located in the upper left corner of the coding unit; and to determine the at least one model parameter the one or more processors are further configured to obtain a set of reconstructed samples forming an L-shape based on the first motion vector; and evaluate a local distortion based on the set of reconstructed samples.

Another example of an embodiment of apparatus can comprise one or more processors, wherein the one or more processors are configured to process video information based on an affine motion model to produce motion compensation information; obtain a local illumination compensation model; and encode the video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; wherein the first motion vector is associated with a center of the coding unit; and to determine the at least one model parameter the one or more processors are further configured to obtain a set of reconstructed samples forming an L-shape based on the first motion vector; and evaluate a local distortion based on the set of reconstructed samples.

Another example of an embodiment of apparatus can comprise one or more processors, wherein the one or more processors are configured to process video information based on a coding unit comprising a plurality of sub-blocks to produce motion compensation information comprising a plurality of motion vectors associated with respective ones of the plurality of sub-blocks; obtain a local illumination compensation model; and encode the video information based on the motion compensation information and the local illumination compensation model; wherein to obtain the local illumination compensation model the one or more processors are further configured to determine at least one model parameter of a linear model of illumination changes in the video information based on at least one of the plurality of motion vectors; and the plurality of sub-blocks included in the coding unit comprises a first row of sub-blocks and a first column of sub-blocks; and the plurality of motion vectors comprises a group of motion vectors associated with respective ones of each sub-block included in the first row of sub-blocks and each sub-block included in the first column of sub-blocks; and wherein to determine the at least one model parameter the one or more processors are further configured to obtain a set of reconstructed samples forming a quasi L-shape based on the group of motion vectors; and evaluate a local distortion based on the set of reconstructed samples.

Another example of an embodiment of apparatus can comprise one or more processors, wherein the one or more processors are configured to process video information based on a coding unit comprising a plurality of sub-blocks to produce motion compensation information; obtain a local illumination compensation model; and encode the video information based on the motion compensation information and the local illumination compensation model; wherein the plurality of sub-blocks included in the coding unit comprises a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and to obtain the local illumination compensation model the one or more processors are further configured to determine at least one model parameter of a linear model of illumination changes in the video information based on one or more of a first subset of the first set of motion vectors or a second subset of the second set of motion vectors; and to determine the at least one model parameter the one or more processors are further configured to obtain a set of reconstructed samples forming a quasi L-shape based on the one or more of the first subset of the first set of motion vectors or the second subset of the second set of motion vectors; and evaluate a local distortion based on the set of reconstructed samples.

Another example of an embodiment of apparatus can comprise one or more processors, wherein the one or more processors are configured to process video information based on a coding unit comprising a plurality of sub-blocks to produce motion compensation information comprising a plurality of motion vectors associated with respective ones of the plurality of sub-blocks; obtain a local illumination compensation model; and encode the video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; and the first motion vector is associated with a first one of the plurality of sub-blocks located in an upper left corner of the coding unit; and wherein to determine the at least one model parameter the one or more processors are further configured to obtain a set of reconstructed samples forming an L-shape based on the first motion vector; and evaluate a local distortion based on the set of reconstructed samples.

Another example of an embodiment of apparatus can comprise one or more processors, wherein the one or more processors are configured to process video information based on a coding unit comprising a plurality of sub-blocks to produce motion compensation information comprising a plurality of motion vectors associated with respective ones of the plurality of sub-blocks; obtain a local illumination compensation model; and encode the video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; and the first motion vector is associated with a center of the coding unit; and to determine the at least one model parameter the one or more processors are further configured to obtain a set of reconstructed samples forming an L-shape based on the first motion vector; and evaluate a local distortion based on the set of reconstructed samples.

An example of an embodiment of a method can comprise processing encoded video information based on an affine motion model to produce motion compensation information; obtain a local illumination compensation model; and decoding the encoded video information based on the motion compensation information and the local illumination compensation model; wherein obtaining the local illumination compensation model comprises determining at least one model parameter of a linear model of illumination changes in the video information based on a plurality of motion vectors included in the motion compensation information; and the video information comprises a coding unit having a plurality of sub-blocks including a first row of sub-blocks and a first column of sub-blocks; and the plurality of motion vectors comprises a group of motion vectors associated with respective ones of each sub-block included in the first row of sub-blocks and each sub-block included in the first column of sub-blocks; and determining the at least one model parameter comprises obtaining a set of reconstructed samples forming a quasi L-shape based on the group of motion vectors; and evaluating a local distortion based on the set of reconstructed samples.

Another example of an embodiment of a method can comprise processing encoded video information based on an affine motion model to produce motion compensation information; obtaining a local illumination compensation model; and decoding the encoded video information based on the motion compensation information and the local illumination compensation model; wherein the video information comprises a coding unit having a plurality of sub-blocks including a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and obtaining the local illumination compensation model comprises determining at least one model parameter of a linear model of illumination changes in the video information based on one or more of a first subset of the first set of motion vectors or a second subset of the second set of motion vectors; and determining the at least one model parameter comprises obtaining a set of reconstructed samples forming a quasi L-shape based on the one or more of the first subset of the first set of motion vectors or the second subset of the second subset of motion vectors; and evaluating a local distortion based on the set of reconstructed samples.

Another example of an embodiment of a method can comprise processing encoded video information based on an affine motion model to produce motion compensation information; obtaining a local illumination compensation model; and decoding the encoded video information based on the motion compensation information and the local illumination compensation model; wherein obtaining the local illumination compensation model comprises determining at least one model parameter of a linear model of illumination changes in the video information based on a first motion vector included in the motion compensation information; and the video information comprises a coding unit having a plurality of sub-blocks; and the first motion vector is associated with a first one of the plurality of sub-blocks located in the upper left corner of the coding unit; and determining the at least one model parameter comprises obtaining a set of reconstructed samples forming an L-shape based on the first motion vector; and evaluating a local distortion based on the set of reconstructed samples.

Another example of an embodiment of a method can comprise processing encoded video information based on an affine motion model to produce motion compensation information; obtaining a local illumination compensation model; and decoding the encoded video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a center of the coding unit; and determining the at least one model parameter comprises obtaining a set of reconstructed samples forming an L-shape based on the first motion vector; and evaluating a local distortion based on the set of reconstructed samples.

Another example of an embodiment of a method can comprise processing encoded video information based on a coding unit comprising a plurality of sub-blocks to produce motion compensation information comprising a plurality of motion vectors associated with respective ones of the plurality of sub-blocks; obtaining a local illumination compensation model; and decoding the encoded video information based on the motion compensation information and the local illumination compensation model; wherein obtaining the local illumination compensation model comprises determining at least one model parameter of a linear model of illumination changes in the video information based on at least one of the plurality of motion vectors; and the plurality of sub-blocks included in the coding unit comprises a first row of sub-blocks and a first column of sub-blocks; and the plurality of motion vectors comprises a group of motion vectors associated with respective ones of each sub-block included in the first row of sub-blocks and each sub-block included in the first column of sub-blocks; and determining the at least one model parameter comprises obtaining a set of reconstructed samples forming a quasi L-shape based on the group of motion vectors; and evaluating a local distortion based on the set of reconstructed samples.

Another example of an embodiment of a method can comprise processing encoded video information based on a coding unit comprising a plurality of sub-blocks to produce motion compensation information; obtaining a local illumination compensation model; and decoding the encoded video information based on the motion compensation information and the local illumination compensation model; wherein the plurality of sub-blocks included in the coding unit comprises a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and obtaining the local illumination compensation model comprises determining at least one model parameter of a linear model of illumination changes in the video information based on one or more of a first subset of the first set of motion vectors or a second subset of the second set of motion vectors; and determining the at least one model parameter comprises obtaining a set of reconstructed samples forming a quasi L-shape based on the one or more of the first subset of the first set of motion vectors or the second subset of motion vectors; and evaluating a local distortion based on the set of reconstructed samples.

Another example of an embodiment of a method can comprise processing encoded video information based on a coding unit comprising a plurality of sub-blocks to produce motion compensation information comprising a plurality of motion vectors associated with respective ones of the plurality of sub-blocks; obtaining a local illumination compensation model; and decoding the encoded video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a first one of the plurality of sub-blocks located in an upper left corner of the coding unit; and determining the at least one model parameter comprises obtaining a set of reconstructed samples forming an L-shape based on the first motion vector; and evaluating a local distortion based on the set of reconstructed samples.

Another example of an embodiment of a method can comprise processing encoded video information based on a coding unit comprising a plurality of sub-blocks to produce motion compensation information comprising a plurality of motion vectors associated with respective ones of the plurality of sub-blocks; obtaining a local illumination compensation model; and decoding the encoded video information based on the motion compensation information and the local illumination compensation model; wherein obtaining the local illumination compensation model comprises determining at least one model parameter of a linear model of illumination changes in the video information based on a first motion vector included in the motion compensation information; and the first motion vector is associated with a center of the coding unit; and determining the at least one model parameter comprises obtaining a set of reconstructed samples forming an L-shape based on the first motion vector; and evaluating a local distortion based on the set of reconstructed samples.

An example of an embodiment of apparatus can comprise one or more processors, wherein the one or more processors are configured to process encoded video information based on an affine motion model to produce motion compensation information; obtain a local illumination compensation model; and decode the encoded video information based on the motion compensation information and the local illumination compensation model; wherein to obtain the local illumination compensation model the one or more processors are further configured to determine at least one model parameter of a linear model of illumination changes in the video information based on a plurality of motion vectors included in the motion compensation information; wherein the video information comprises a coding unit having a plurality of sub-blocks including a first row of sub-blocks and a first column of sub-blocks; and the plurality of motion vectors comprises a group of motion vectors associated with respective ones of each sub-block included in the first row of sub-blocks and each sub-block included in the first column of sub-blocks; and to determine the at least one model parameter the one or more processors are further configured to obtain a set of reconstructed samples forming a quasi L-shape based on the group of motion vectors; and evaluate a local distortion based on the set of reconstructed samples.

Another example of an embodiment of apparatus can comprise one or more processors, wherein the one or more processors are configured to process encoded video information based on an affine motion model to produce motion compensation information; obtain a local illumination compensation model; and decode the encoded video information based on the motion compensation information and the local illumination compensation model; wherein the video information comprises a coding unit having a plurality of sub-blocks including a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and to obtain the local illumination compensation model the one or more processors are further configured to determine at least one model parameter of a linear model of illumination changes in the video information based on one or more of a first subset of the first set of motion vectors or a second subset of the second set of motion vectors; and to determine the at least one model parameter the one or more processors are further configured to obtain a set of reconstructed samples forming a quasi L-shape based on the one or more of the first subset of the first set of motion vectors or the second subset of the second set of motion vectors; and evaluate a local distortion based on the set of reconstructed samples.

Another example of an embodiment of apparatus can comprise one or more processors, wherein the one or more processors are configured to process encoded video information based on an affine motion model to produce motion compensation information; obtain a local illumination compensation model; and decode the encoded video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; and wherein the video information comprises a coding unit having a plurality of sub-blocks; and the first motion vector is associated with a first one of the plurality of sub-blocks located in the upper left corner of the coding unit; and to determine the at least one model parameter the one or more processors are further configured to obtain a set of reconstructed samples forming an L-shape based on the first motion vector; and evaluate a local distortion based on the set of reconstructed samples.

Another example of an embodiment of apparatus can comprise one or more processors, wherein the one or more processors are configured to process encoded video information based on an affine motion model to produce motion compensation information; obtain a local illumination compensation model; and decode the encoded video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; wherein the first motion vector is associated with a center of the coding unit; and to determine the at least one model parameter the one or more processors are further configured to obtain a set of reconstructed samples forming an L-shape based on the first motion vector; and evaluate a local distortion based on the set of reconstructed samples.

Another example of an embodiment of apparatus can comprise one or more processors, wherein the one or more processors are configured to process encoded video information based on a coding unit comprising a plurality of sub-blocks to produce motion compensation information comprising a plurality of motion vectors associated with respective ones of the plurality of sub-blocks; obtain a local illumination compensation model; and decode the encoded video information based on the motion compensation information and the local illumination compensation model; wherein to obtain the local illumination compensation model the one or more processors are further configured to determine at least one model parameter of a linear model of illumination changes in the video information based on at least one of the plurality of motion vectors; and the plurality of sub-blocks included in the coding unit comprises a first row of sub-blocks and a first column of sub-blocks; and the plurality of motion vectors comprises a group of motion vectors associated with respective ones of each sub-block included in the first row of sub-blocks and each sub-block included in the first column of sub-blocks; and wherein to determine the at least one model parameter the one or more processors are further configured to obtain a set of reconstructed samples forming a quasi L-shape based on the group of motion vectors; and evaluate a local distortion based on the set of reconstructed samples.

Another example of an embodiment of apparatus can comprise one or more processors, wherein the one or more processors are configured to process encoded video information based on a coding unit comprising a plurality of sub-blocks to produce motion compensation information; obtain a local illumination compensation model; and decode the encoded video information based on the motion compensation information and the local illumination compensation model; wherein the plurality of sub-blocks included in the coding unit comprises a first row of sub-blocks and a first column of sub-blocks; and the motion compensation information comprises a first set of motion vectors associated with respective ones of each sub-block included in the first row of sub-blocks and a second set of motion vectors associated with respective ones of each sub-block included in the first column of sub-blocks; and to obtain the local illumination compensation model, the one or more processors are further configured to determine at least one model parameter of a linear model of illumination changes in the video information based on one or more of a first subset of the first set of motion vectors or a second subset of the second set of motion vectors; and to determine the at least one model parameter the one or more processors are further configured to obtain a set of reconstructed samples forming a quasi L-shape based on the one or more of the first subset of the first set of motion vectors or the second subset of the second set of motion vectors; and evaluate a local distortion based on the set of reconstructed samples.

Another example of an embodiment of apparatus can comprise one or more processors, wherein the one or more processors are configured to process encoded video information based on a coding unit comprising a plurality of sub-blocks to produce motion compensation information comprising a plurality of motion vectors associated with respective ones of the plurality of sub-blocks; obtain a local illumination compensation model; and decode the encoded video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; and the first motion vector is associated with a first one of the plurality of sub-blocks located in an upper left corner of the coding unit; and wherein to determine the at least one model parameter the one or more processors are further configured to obtain a set of reconstructed samples forming an L-shape based on the first motion vector; and evaluate a local distortion based on the set of reconstructed samples.

Another example of an embodiment of apparatus can comprise one or more processors, wherein the one or more processors are configured to process encoded video information based on a coding unit comprising a plurality of sub-blocks to produce motion compensation information comprising a plurality of motion vectors associated with respective ones of the plurality of sub-blocks; obtain a local illumination compensation model; and decode the encoded video information based on the motion compensation information and the local illumination compensation model; wherein to obtain the local illumination compensation model the one or more processors are further configured to determine at least one model parameter of a linear model of illumination changes in the video information based on a first motion vector included in the motion compensation information; and the first motion vector is associated with a center of the coding unit; and to determine the at least one model parameter the one or more processors are further configured to obtain a set of reconstructed samples forming an L-shape based on the first motion vector; and evaluate a local distortion based on the set of reconstructed samples.

In a variant of at least one embodiment described herein involving a coding unit having a plurality of sub-blocks including a first row of sub-blocks and a first column of sub-blocks, a first subset of motion vectors includes a first motion vector corresponding to a sub-block located in a middle position of the first row of sub-blocks, and a second subset of motion vectors includes a second motion vector corresponding to a sub-block located in a middle position of the first column of sub-blocks.

In a variant of at least one embodiment described herein involving a plurality of sub-blocks of a coding unit, the plurality of sub-blocks can be partitioned into a plurality of groups of sub-blocks; and a model parameter of a local illumination compensation model can be determined for each of the plurality of groups of sub-blocks; and encoding or decoding based on the local illumination compensation model can comprise processing video information associated with each group of sub-blocks using the respective at least one model parameter determined for each group.

In a variant of at least one embodiment described herein involving grouping sub-blocks, at least one of a first number of sub-blocks in each group of sub-blocks and a second number of groups formed for a coding unit are selected based on a size of the coding unit.

A variant of at least one embodiment described herein involving encoding video information can comprise determining a rate distortion metric associated with applying a local illumination compensation model; and providing a syntax element in the encoded video information having a value based on the rate distortion metric.

In a variant of at least one embodiment described herein involving an at least one model parameter of a linear model, the at least one model parameter can comprise a pair of first and second model parameters corresponding to a scaling factor and an offset.

Another example of an embodiment can involve a computer program product comprising computing instructions for performing any method as described herein when executed by one or more processors.

Another example of an embodiment can involve a non-transitory computer readable medium storing executable program instructions to cause a computer executing the instructions to perform any method as described herein.

Another example of an embodiment can involve a bitstream, formatted to include encoded video information produced by a method as described herein.

A variant of an embodiment of a bitstream as described herein can involve encoded video information including: an indicator indicating encoding of the video information based on the local illumination compensation model and an affine motion model; and picture information encoded based on the local illumination compensation model and the affine motion model.

Another example of an embodiment can involve a device comprising an apparatus as described herein; and at least one of (i) an antenna configured to receive a signal, the signal including data representative of the video information, (ii) a band limiter configured to limit the received signal to a band of frequencies that includes the data representative of the video information, and (iii) a display configured to display an image from the video information.

At least one embodiment can involve a method or apparatus as described herein, wherein the second one of the plurality of sub-blocks is located in a middle position of the top row of sub-blocks, and the third one of the plurality of sub-blocks is located in a middle position of the left column of sub-blocks.

At least one embodiment can involve a method or apparatus as described herein, wherein the at least one model parameter of the linear model comprises a pair of first and second model parameters corresponding to a scaling factor and an offset, and processing the video information based on the linear model comprises processing the plurality of sub-blocks of the current coding unit based on the linear model using the scaling factor and the offset.

At least one embodiment can involve a method or apparatus as described herein, wherein the at least one model parameter of the linear model comprises a pair of first and second model parameters corresponding to a scaling factor and an offset, and obtaining the at least one parameter of the linear model comprises partitioning the plurality of sub-blocks of the current coding unit into a plurality of groups of sub-blocks; determining the pair of model parameters for each of the plurality of groups of sub-blocks to produce a plurality of pairs of parameters; and processing each of the groups of sub-blocks of the video information based on the linear model using a respective one of the plurality of pairs of parameters.

At least one embodiment can involve a method or apparatus processing a plurality of groups of sub-blocks as described herein, wherein at least one of a first number of sub-blocks in each group of sub-blocks and a second number of sub-groups formed for a current coding unit are selected based on a size of the current coding unit.

At least one embodiment can involve a method or apparatus for encoding video information as described herein and further comprising determining a rate distortion metric based on applying the local illumination compensation; and providing a syntax element in the encoded video information having a value based on the rate distortion metric.

At least one embodiment can involve a bitstream, formatted to include encoded video information, wherein the encoded video information includes an indicator indicating encoding of the video information based on a local illumination compensation model and an affine motion model; and picture information encoded based on the local illumination compensation model and the affine motion model.

At least one embodiment can involve a device comprising an apparatus according to any embodiment described herein and further comprising at least one of (i) an antenna configured to receive a signal, the signal including data representative of the video information, (ii) a band limiter configured to limit the received signal to a band of frequencies that includes the data representative of the video information, and (iii) a display configured to display an image from the video information.

In at least one embodiment, the proposed LIC parameters for affine model are derived for other sub-CU based motion vector prediction (i.e., "subblock-based temporal merging candidates": Alternative Temporal Motion Vector Prediction (ATMVP), and Spatial-Temporal Motion Vector Prediction (STMVP), and Subblock-based Temporal Motion Vector Prediction (SbTMVP)) when the LIC tool is activated.

At least one embodiment involves enabling compensations with predictive encoding and/or decoding.

One or more embodiments to derive the proposed LIC parameters as described herein can apply to deriving other parameters such as parameters for scaling and/or offsets and/or selections.

At least one other embodiment can involve modifying pixel values of the predicted block (block that the motion vector points to) where modification can be by a variety of filters, e.g., illumination compensation as described herein and/or color compensation.

At least one other embodiment can involve the predictor block being based on a motion vector produced by various modes including a predictor determined by intra coding.

At least one embodiment involves enabling a block-based local illumination compensation (LIC) tool when affine motion prediction is employed for an inter-mode coded Coding Unit (CU).

At least one embodiment involves activating the LIC tool for an inter-mode coded CU, which employs affine model to represent the motion vectors.

At least one embodiment involves activating the LIC tool, e.g., for an inter-mode coded CU using the affine model and can include the LIC flag decision for Affine AMVP and Affine Merge, and the corresponding LIC parameters derivation rules.

At least one embodiment involves how to activate the LIC tool and make related rules for inter-mode coded using affine motion prediction, in a way that provides good compression efficiency (rate distortion performance) together with a minimum complexity increase of the coding design.

At least one embodiment includes:
Determining the LIC flag for an inter-mode coded CU using the affine motion prediction. For Affine AMVP, an iteration loop over the LIC tool can be applied to decide the LIC flag, and the LIC flag signaled to the bitstream. Otherwise, for Affine Merge, the LIC flag can be copied from neighboring blocks, in a way similar to motion information copy in merge mode, e.g., determining a LIC flag based on at least one affine control point associated with a neighboring block. [encoder/decoder]

At least one embodiment includes:
Based on determining the LIC flag is true, make a rule to derive the corresponding LIC parameters. Several aspects are typically involved. For example, use a single motion vector of the first sub-block, or take multiple motion vectors of the sub-blocks in the first row/column into consideration. As another example, generate a unique pair of LIC parameters for the entire CU. As another example, derive multiple pairs of LIC parameters. [encoder/decoder]

At least one embodiment improves a correction of block prediction samples based on considering an illumination variation, e.g., by enabling the LIC tool for an inter-mode coded CU using the affine motion prediction.

Various embodiments described herein provide an advantage of improving coding efficiency.

At least one embodiment is based on the inventors' recognition that an approach involving the LIC being deactivated in affine model cannot fully incorporate the potential performance due to the block prediction samples via affine motion compensation due to being not corrected by considering the illumination variation.

In at least one embodiment, LIC parameters can be derived at the decoder side in accordance with one or more embodiments for deriving the parameters at the encoder side without requiring an extra bit to encode into the bitstream, thereby introducing no extra burden on bit rate.

At least one embodiment may involve inserting in the signaling syntax elements that enable the decoder to derive parameters such as LIC parameters based on an embodiment used at the encoder side.

In at least one embodiment, a method to apply at a decoder can be selected based on one or more syntax elements inserted in the signaling.

In at least one embodiment, a bitstream or signal includes one or more of the described syntax elements, or variations thereof.

At least one embodiment involves creating and/or transmitting and/or receiving and/or decoding a bitstream or signal that includes one or more of the described syntax elements, or variations thereof.

A TV, set-top box, cell phone, tablet, or other electronic device that implements any of the embodiments described.

A TV, set-top box, cell phone, tablet, or other electronic device that implements any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and processes the image according to any of the embodiments described.

A TV, set-top box, cell phone, tablet, or other electronic device that receives (e.g. using an antenna) a signal over the air that includes an encoded image, and processes the image according to any of the embodiments described.

An embodiment may include a computer program product including program code that, when executed, performs a method according to any embodiment described herein.

An embodiment may include a computer readable medium storing program code that, when executed, performs a method according to any embodiment described herein.

Various other generalized, as well as particularized, inventions and claims are also supported and contemplated throughout this disclosure.

The invention claimed is:

1. A video decoding device comprising:
a processor configured to:
obtain an affine motion model associated with a block, the affine motion model comprising a plurality of control point motion vectors;
obtain local illumination compensation information associated with the block based on the plurality of control point motion vectors of the affine motion model associated with the block; and
decode the block based on the affine motion model and the local illumination compensation information.

2. The video decoding device of claim 1, wherein the processor is further configured to:
obtain a prediction of the block based on the affine motion model; and
adjust the prediction of the block based on the local illumination compensation information wherein the block is decoded based on the adjusted prediction of the block.

3. The video decoding device of claim 1,
wherein the block comprises a plurality of sub-blocks, and
wherein the processor is further configured to:
obtain a plurality of prediction sub-blocks based on the affine motion model; and
adjust the plurality of prediction sub-blocks based on the local illumination compensation information, wherein the block is decoded based on the adjusted plurality of prediction sub-blocks.

4. The video decoding device of claim 1,
wherein the block comprises a plurality of sub-blocks, and
wherein the processor is further configured to:
determine, based on the plurality of control point motion vectors, a first motion vector associated with a first sub-block of the plurality of sub-blocks;
derive a set of local illumination compensation parameters based on the first motion vector and a template of the block;
obtain a plurality of prediction sub-blocks based on the affine motion model; and
apply the set of local illumination compensation parameters to the plurality of prediction sub-blocks.

5. The video decoding device of claim 4,
wherein the processor configured to derive the set of local illumination compensation parameters based on the first motion vector and the template of the block is further configured to:
determine, based on the first motion vector, at least one sample associated with a reference block; and
compare the at least one sample associated with the reference block to the template of the block.

6. The video decoding device of claim 5,
wherein the processor configured to compare the at least one sample associated with the reference block to the template of the block is further configured to compare the at least one sample associated with the reference block to one or more samples comprised in the template.

7. The video decoding device of claim 1,
wherein the block comprises a plurality of sub-blocks, and
wherein the processor is further configured to:
determine, based on the plurality of control point motion vectors, a plurality of motion vectors associated with respective sub-blocks in the plurality of sub-blocks;
obtain a plurality of template samples based on the plurality of motion vectors associated with respective sub-blocks;
derive a set of local illumination compensation parameters based on the plurality of template samples and a template of the block;
obtain a plurality of prediction sub-blocks based on the affine motion model; and
apply the set of local illumination compensation parameters to the plurality of prediction sub-blocks.

8. The video decoding device of claim 7,
wherein the processor configured to obtain the plurality of template samples based on the plurality of motion vectors associated with the respective sub-blocks is further configured to:
determine, based on the plurality of motion vectors, at least one of the plurality of template samples for each of a corresponding one of the respective sub-blocks.

9. The video decoding device of claim 8, wherein the plurality of template samples form a quasi-L shape.

10. The video decoding device of claim 8,
wherein the processor configured to derive the set of local illumination compensation parameters based on the plurality of template samples and the template of the block is further configured to:
compare each of the plurality of template samples to a corresponding sample comprised in the template and associated with a respective sub-block.

11. A method of video decoding, comprising:
obtaining an affine motion model associated with a block, the affine motion model comprising a plurality of control point motion vectors;
obtaining local illumination compensation information associated with the block based on the plurality of control point motion vectors of the affine motion model associated with the block; and
decoding the block based on the affine motion model and the local illumination compensation information.

12. The method of claim 11, further comprising:
obtaining a prediction of the block based on the affine motion model; and
adjusting the prediction of the block based on the local illumination compensation information wherein the block is decoded based on the adjusted prediction of the block.

13. The method of claim 11,
wherein the block comprises a plurality of sub-blocks, and
wherein the method further comprises:
obtaining a plurality of prediction sub-blocks based on the affine motion model; and
adjusting the plurality of prediction sub-blocks based on the local illumination compensation information, wherein the block is decoded based on the adjusted plurality of adjusted prediction sub-blocks.

14. The method of claim 11,
wherein the block comprises a plurality of sub-blocks, and
wherein the method further comprises:
determining, based on the plurality of control point motion vectors, a first motion vector associated with a first sub-block of the plurality of sub-blocks;
deriving a set of local illumination compensation parameters based on the first motion vector and a template of the block;
obtaining a plurality of prediction sub-blocks based on the affine motion model; and
applying the set of local illumination compensation parameters to the plurality of prediction sub-blocks.

15. The method of claim 14,
wherein deriving the set of local illumination compensation parameters based on the first motion vector and the template of the block comprises:
determining, based on the first motion vector, at least one sample associated with a reference block; and
comparing the at least one sample associated with the reference block to the template of the block.

16. The method of claim 15,
wherein comparing the at least one sample associated with the reference block to the template of the block comprises comparing the at least one sample associated with the reference block to one or more samples comprised in the template.

17. The method of claim 11,
wherein the block comprises a plurality of sub-blocks, and
wherein the method further comprises:
determining, based on the plurality of control point motion vectors, a plurality of motion vectors associated with respective sub-blocks in the plurality of sub-blocks;
obtaining a plurality of template samples based on the plurality of motion vectors associated with respective sub-blocks;
deriving a set of local illumination compensation parameters based on the plurality of template samples and a template of the block;
obtaining a plurality of prediction sub-blocks based on the affine motion model; and
applying the set of local illumination compensation parameters to the plurality of prediction sub-blocks.

18. The method of claim 17,
wherein obtaining the plurality of template samples based on the plurality of motion vectors associated with the respective sub-blocks comprises:
determining, based on the plurality of motion vectors, at least one of the plurality of template samples for each of a corresponding one of the respective sub-blocks.

19. The method of claim 18, wherein the plurality of template samples form a quasi-L shape.

20. A non-transitory computer readable medium having stored thereon executable program instructions that cause a computer executing the executable program instructions to perform a method comprising:
obtaining an affine motion model associated with a block, the affine motion model comprising a plurality of control point motion vectors;
obtaining local illumination compensation information associated with the block based on the plurality of control point motion vectors of the affine motion model associated with the block; and
decoding the block based on the affine motion model and the local illumination compensation information.

* * * * *